(12) United States Patent
Sarich

(10) Patent No.: US 6,281,594 B1
(45) Date of Patent: Aug. 28, 2001

(54) HUMAN POWERED ELECTRICAL GENERATION SYSTEM

(76) Inventor: Ivan Marijan Sarich, 8510 Lake Point Dr., Franklin, WI (US) 53132

( * ) Notice: Subject to any disclaimer, the term of this patent is extended or adjusted under 35 U.S.C. 154(b) by 0 days.

(21) Appl. No.: 09/360,167

(22) Filed: Jul. 26, 1999

(51) Int. Cl.$^7$ .................................. H02P 9/04; H02P 9/02
(52) U.S. Cl. ........................ 290/1 R; 290/1 E; 290/1 A
(58) Field of Search .................................. 219/497, 486, 219/548; 36/2.6; 623/32, 24; 73/172; 322/1; 290/1 R

(56) References Cited

U.S. PATENT DOCUMENTS

| 983,742 | 2/1911 | Mead | 362/192 |
|---|---|---|---|
| 1,015,298 | 1/1912 | Cleland | 185/39 |
| 4,459,471 | 7/1984 | Hulett et al. | 219/527 |
| 4,665,308 | * 5/1987 | Courvoisier et al. | 219/548 |
| 4,674,199 | * 6/1987 | Lakic | 36/2.6 |
| 4,711,242 | * 12/1987 | Petrofsky | 128/419 |
| 4,736,530 | * 4/1988 | Lakic et al. | 36/2.6 |
| 4,756,095 | * 7/1988 | Lakic | 36/2.6 |
| 4,782,602 | * 11/1988 | Lakic | 36/2.6 |
| 4,823,482 | * 4/1989 | Lakic | 36/2.6 |
| 4,837,494 | 6/1989 | Maier | 322/1 |
| 4,845,338 | 7/1989 | Lakic | 219/211 |
| 5,023,430 | * 6/1991 | Brekkestran et al. | 219/486 |
| 5,032,705 | 7/1991 | Batcheller et al. | 219/211 |
| 5,105,067 | * 4/1992 | Brekkestran et al. | 219/497 |
| 5,167,082 | 12/1992 | Chen | 36/2.6 |
| 5,358,461 | 10/1994 | Bailey, Jr. | 482/2 |
| 5,495,682 | 3/1996 | Chen | 36/2.6 |
| 5,603,648 | 2/1997 | Kea | 441/106 |
| 5,628,722 | * 5/1997 | Solomonow et al. | 602/26 |
| 5,779,735 | * 7/1998 | Molino | 623/44 |

* cited by examiner

Primary Examiner—Nestor Ramirez
Assistant Examiner—Julio C. Gonzalez
(74) Attorney, Agent, or Firm—Richard C. Litman

(57) ABSTRACT

A human powered electrical generation system is disclosed which uses generators incorporated into the soles of specially designed footwear. As the wearer of the footwear walks, mechanical or pneumatic linkages in the soles of the footwear cause the operation of the generators and the production of electrical energy. A special garment designed for use in conjunction with the footwear has conductive pathways that allow electrical power to be supplied to various appliances carried on or about the body of the wearer.

18 Claims, 23 Drawing Sheets

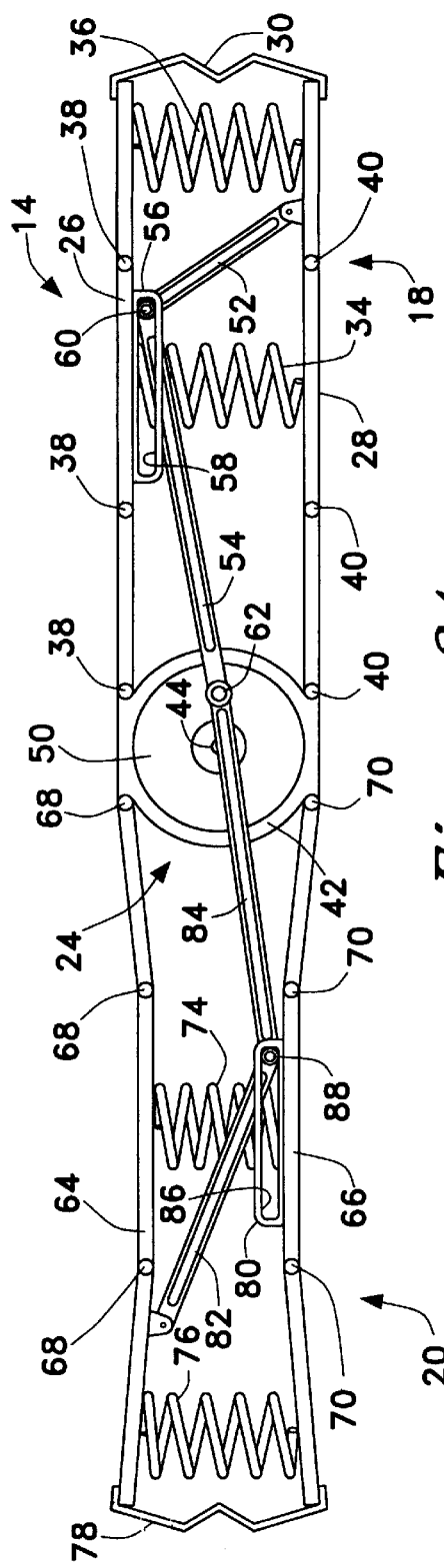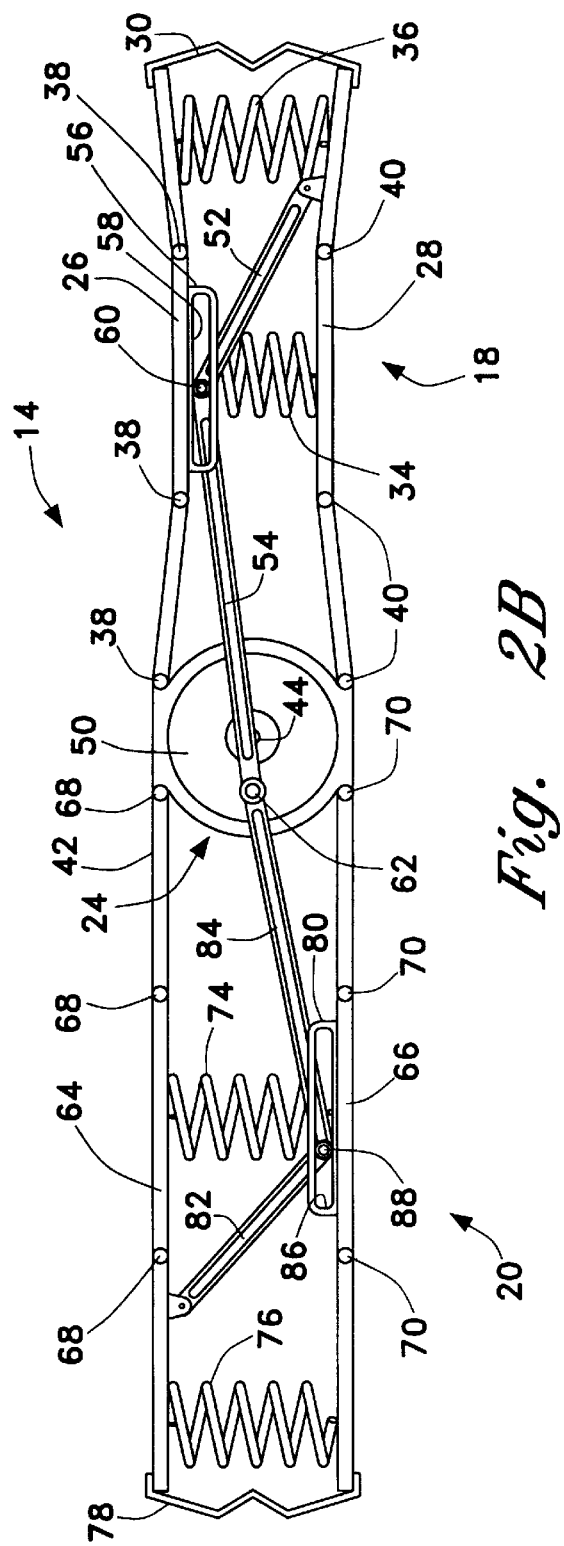

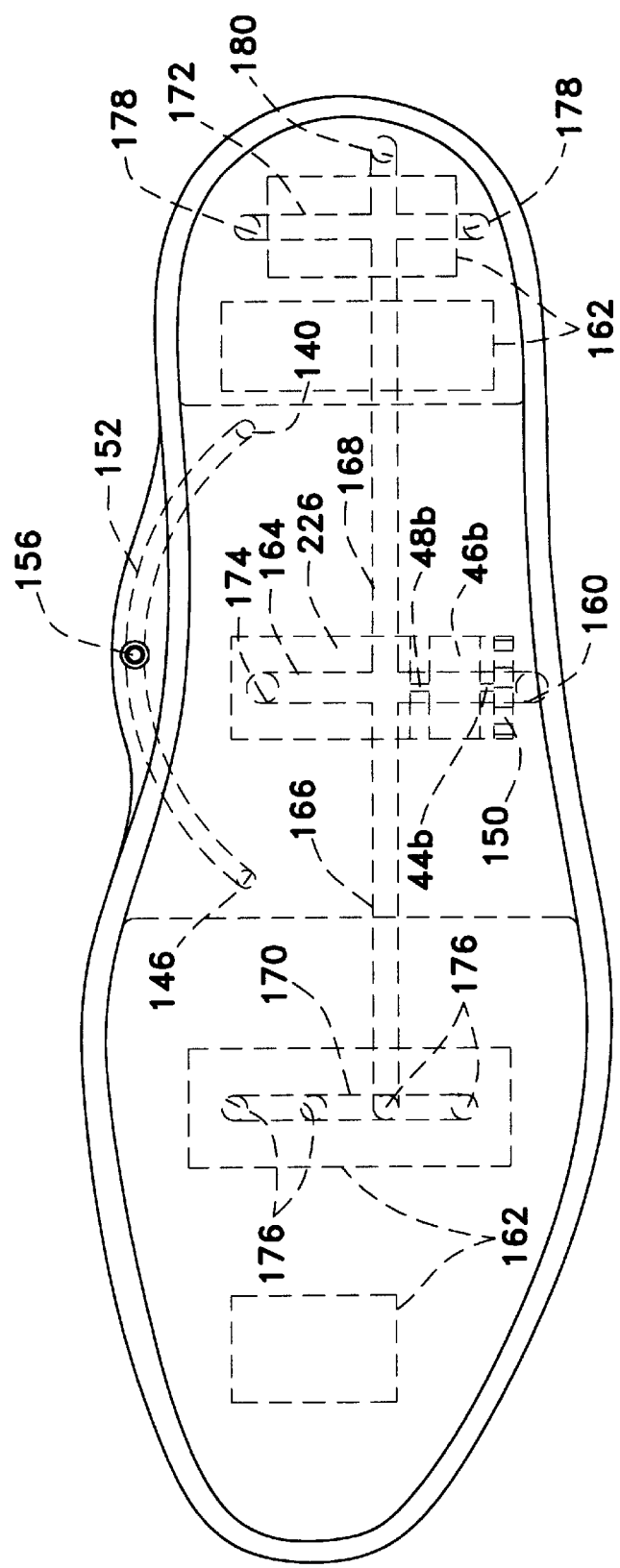

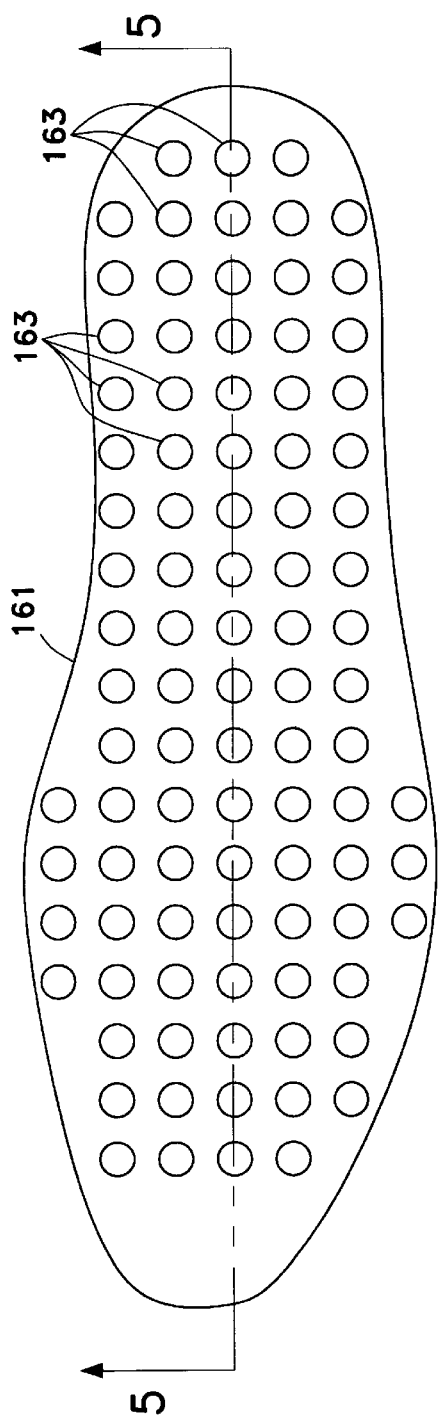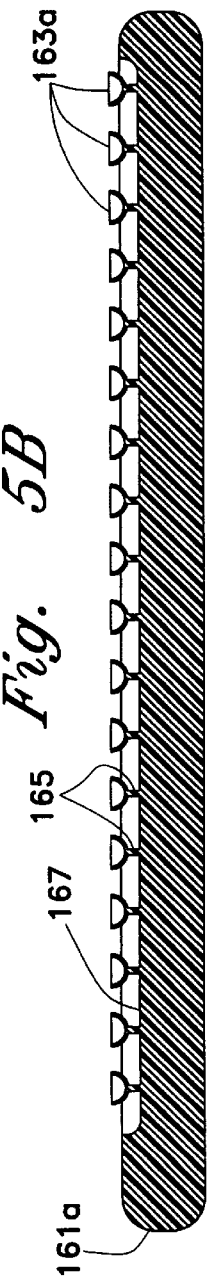

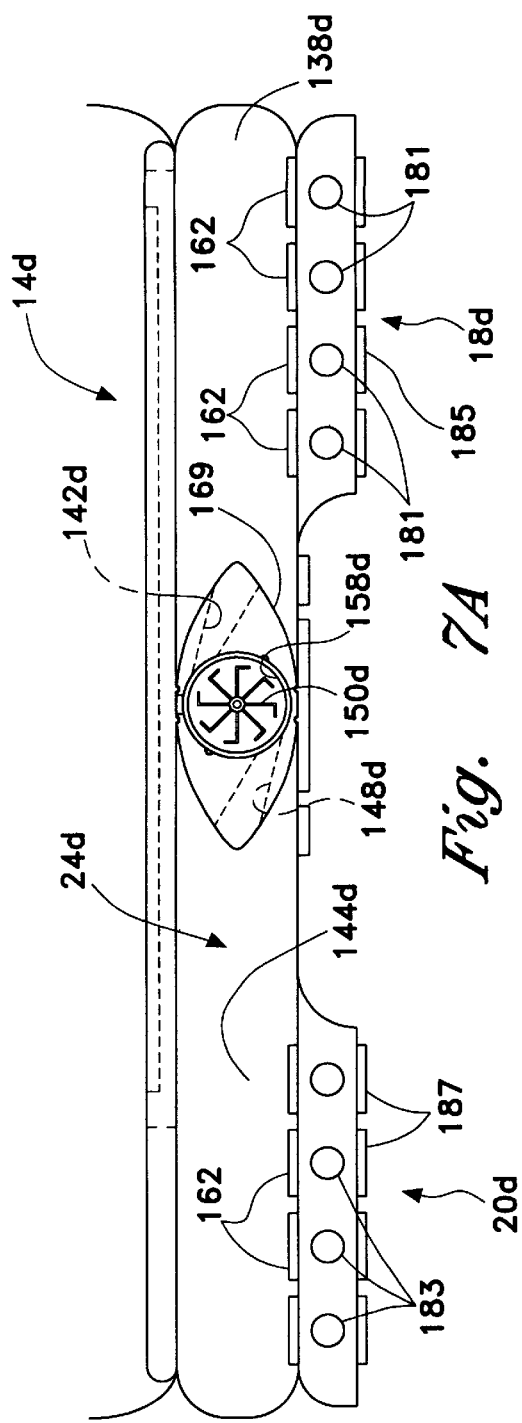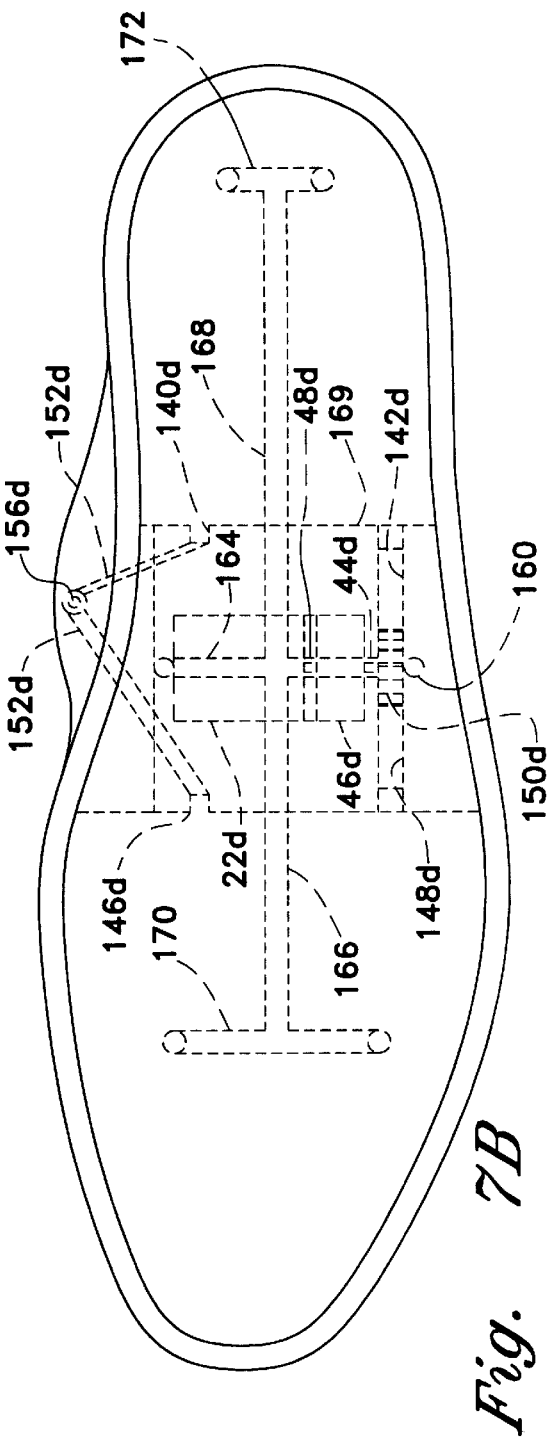

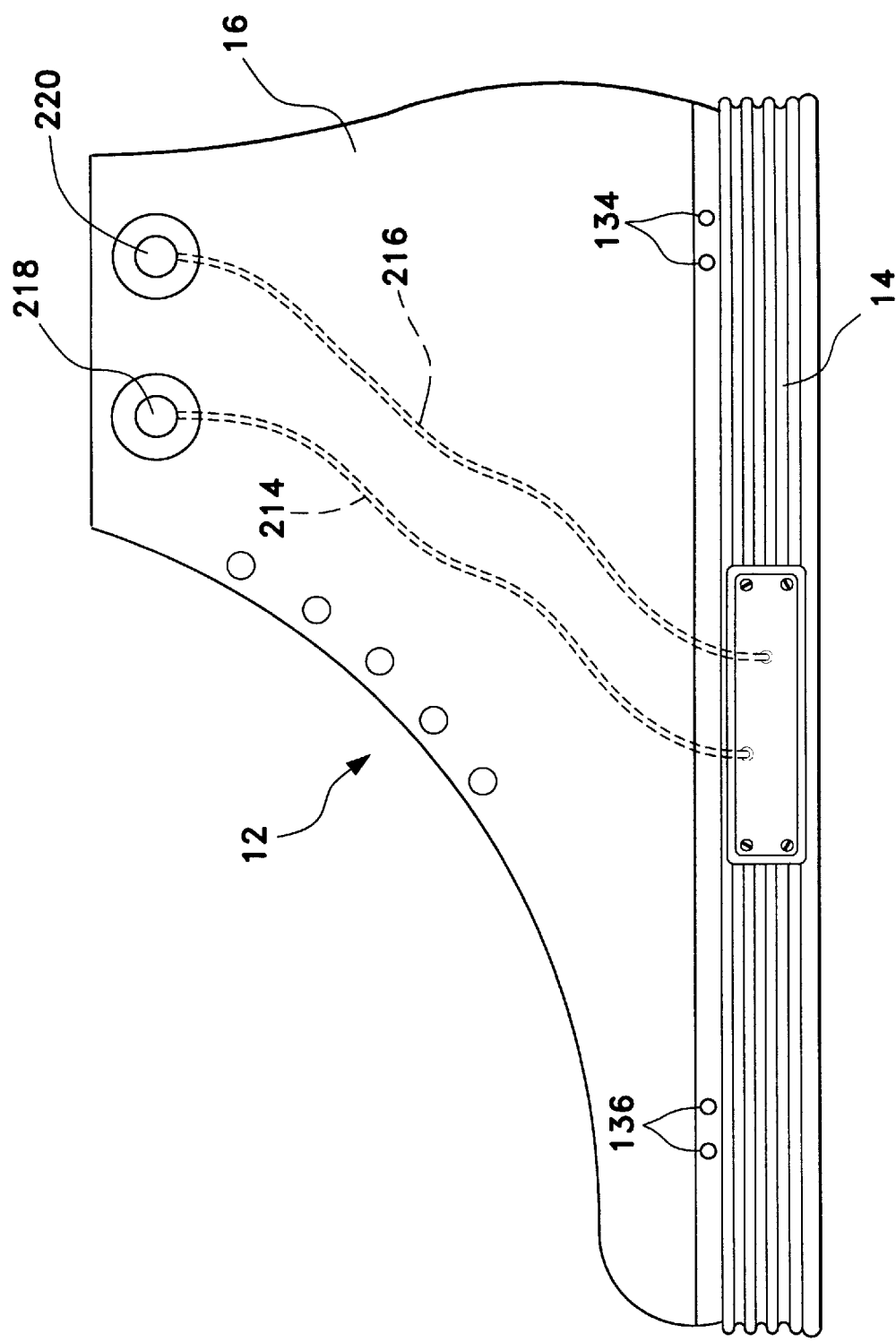

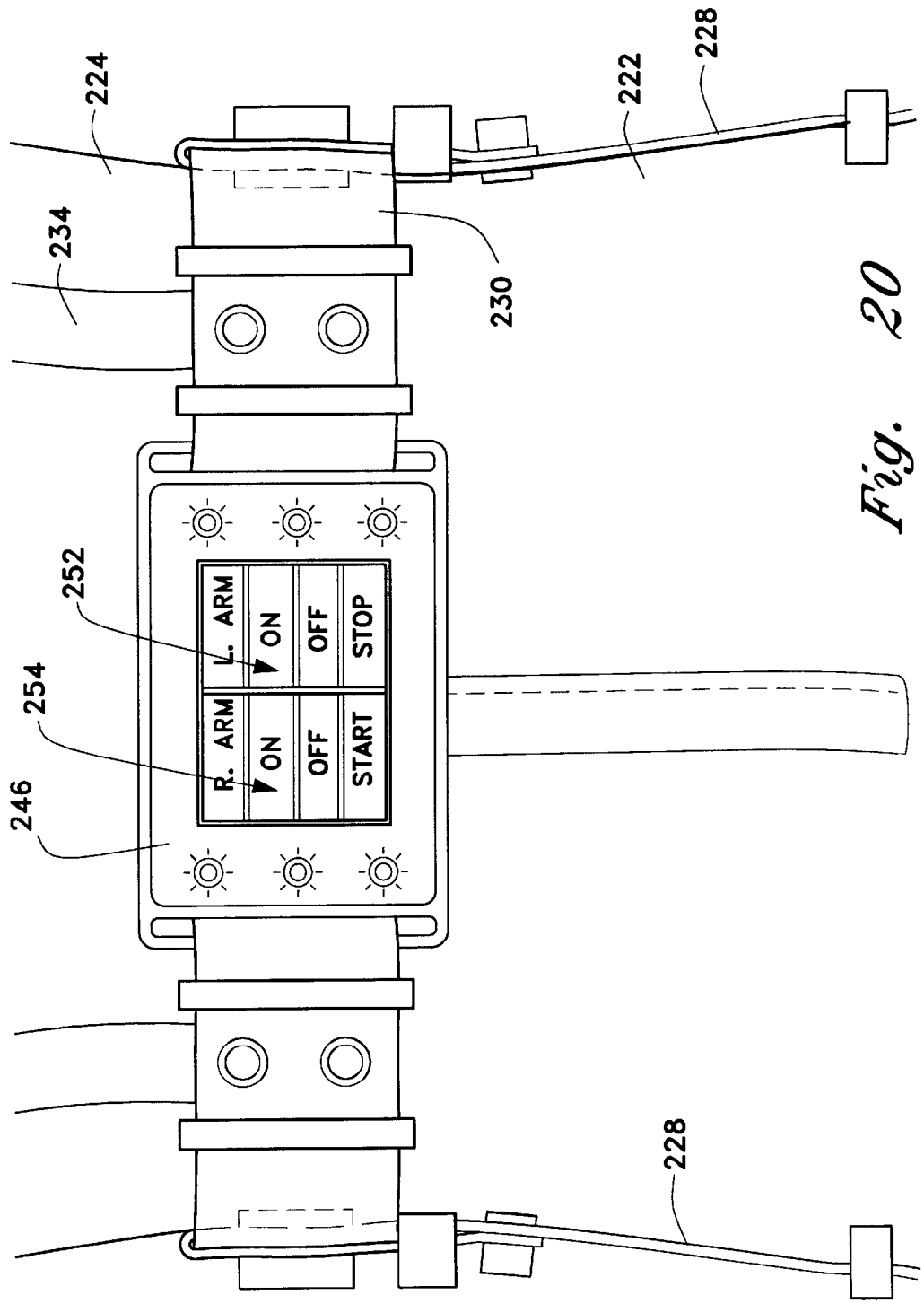

HUMAN POWERED ELECTRICAL GENERATION SYSTEM

BACKGROUND OF THE INVENTION

1. Field of the Invention

The present invention relates to a system that can generate electrical energy incident to the normal activity of walking and use that energy to power an appliance carried by or on the person of a user.

2. Background and Description of the Related Art

Normal daily activities engaged in by humans often involve movement that can be harnessed as a source of energy without interfering with the performance of those normal activities. The energy harnessed from the movement associated with normal daily activities can be used as any of the following; direct power, alternating power, regulated power, or battery charging power. The amount of such energy is sufficient to power portable electric devices such as cellular telephones, notebook or palm-top computers, cameras, drills, artificial limbs, and other medical devices, all of which would otherwise draw their power from wall sockets, or other less efficient batteries. If this human generated energy was used on a wide spread basis, then the total energy savings to society as a whole could be substantial.

Systems that harness energy from normal human movements are known in the art, however, most such systems produce small amounts of energy for operating low power consuming devices such as watches, safety lights, heated shoe liners, cellular telephones, transistor radios, etc. Examples of systems that harness energy from normal human movements can be found among the references cited below. However, none of the references cited below envision storing energy in large enough quantities to run an electric drill, for example. Further, none of the references cited below disclose a garment having an integrated conductive network for distributing electrical energy harnessed from human movements. In addition, none of the references cited below disclose the unique structural features of the present invention.

U.S. Pat. No. 983,742, issued to John W. Mead on Feb. 7, 1911, describes an electric hand lamp. The lamp is powered by a generator within the handgrip, powered by pulling a trigger.

U.S. Pat. No. 1,015,298, issued to H. W. Cleland on Jan. 23, 1912, describes a spring motor used to drive an electric generator within a lamp. To light the lamp, the user reciprocates the operating lever of the spring motor.

U.S. Pat. No. 4,459,471, issued to John G. Hulett et al. on Jul. 10, 1984, describes a heat cap for applying heat to a user's hair.

U.S. Pat. No. 4,837,494, issued to Gregory J. Maier on Jun. 6, 1989, describes a generator mounted on a ski. The generator is powered by a wheel which rolls along the ground during skiing, powering the generator. The generator may power a heater within a ski boot or may recharge a battery.

U.S. Pat. No. 4,845,338, issued to Nikola Lakic on Jul. 4, 1989, describes an inflatable boot liner with an electrical generator and heater. The generator is powered by a mechanical transducer, which translates the vertical movements of the wearer's heel into unidirectional rotational movement.

U.S. Pat. No. 5,023,430, issued to Kevin L. Brekkestran et al. on Jun. 11, 1991, describes a hybrid electronic control system and method for a cold weather garment. A similar invention is described in U.S. Pat. No. 5,105,067, issued to Kevin L. Brekkestran et al. on Apr. 14, 1992.

U.S. Pat. No. 5,032,705, issued to Barry D. Batcheller et al. on Jul. 16, 1991, describes an electrically heated garment.

U.S. Pat. No. 5,167,082, issued to Shi-Hin Chen on Dec. 1, 1992, describes a shoe having a pressure-operated generator inside a watertight compartment adjacent to the heel portion of the shoe sole.

U.S. Pat. No. 5,358,461, issued to Russell M. Bailey, Jr. on Oct. 25, 1994, describes exercise clothing including generator powered lights. The generator is powered by pull cords attached at their ends to grips held in the user's hands.

U.S. Pat. No. 5,495,682, issued to Shi-Hin Chen on Mar. 8, 1996, describes a pressure-operated electric generator contained within the heel of a shoe. The generator is powered by repeated pressure on a press plate caused by walking, and supplies electricity to a rechargeable battery.

U.S. Pat. No. 5,603,648, issued to Miriam Ken on Feb. 18, 1997, describes an outdoor survival garment having a flotation layer, battery powered lights, and a heating element.

None of the above inventions and patents, taken either singularly or in combination, is seen to describe the instant invention as claimed.

SUMMARY OF THE INVENTION

The present invention is directed to human powered electrical generation systems with various degrees of efficiencies, all of which use generators incorporated into the soles of specially designed footwear. As the wearer of the footwear walks, mechanical, pneumatic, or hydraulic mechanisms in the soles of the footwear cause the operation of the generators and the production of electrical energy. A special garment designed for use in conjunction with the footwear has conductive pathways that allow electrical power to be supplied to various appliances carried on or about the body of the wearer.

Accordingly, it is a principal object of the invention to provide a system that can generate electrical energy incident to the normal activity of walking.

It is another object of the invention to provide a system that can power an appliance carried by or on a person using electrical energy generated incident to the normal activity of walking.

It is a further object of the invention to provide a garment that can distribute electrical energy generated incident to the normal activity of walking to various locations on a wearer's body.

Still another object of the invention is to provide a hands-free cellular telephone whose key pad is strapped to the wrist and whose speaker and microphone are disposed about a user's collar.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2A is a side view of the sole of a first embodiment of an electrical energy generating footwear item according to the present invention, partially broken away to reveal internal detail and shown at the beginning of the power generating cycle.

FIG. 2B is a side view of the sole of a first embodiment of an electrical energy generating footwear item according to the present invention, partially broken away to reveal internal detail and shown at the middle of the power generating cycle.

FIG. 4A is a plan view of the sole of a third embodiment of an electrical energy generating footwear item according to the present invention, which uses pneumatic actuation to power a generator.

FIG. 5A is a plan view of a special in-sole having suction cups for use with the third embodiment of an electrical energy generating footwear item of the present invention which uses pneumatic actuation to power a generator.

FIG. 5B is a cross sectional view of the special in-sole taken along line 5—5 of FIG. 5A, for use with the present invention, having suction cups.

FIG. 5C is a cross sectional view of an alternative design for the special in-sole taken along line 5—5 of FIG. 5A, for use with the present invention, having suction cups.

FIG. 7A is a fragmentary side view of the sole of a fourth embodiment of an electrical energy generating footwear item according to the present invention, which has a pneumatic turbine housing which provides arch support to a wearer's foot.

FIG. 7B is a plan view of the sole of a fourth embodiment of an electrical energy generating footwear item according to the present invention, which has a pneumatic turbine housing which provides arch support to a wearer's foot.

FIG. 10 is a side view of an electrical energy generating footwear item according to the present invention.

FIG. 20 is an environmental view showing the control panel of the human powered electrical energy generation system according to the present invention.

Similar reference characters denote corresponding features consistently throughout the attached drawings.

DETAILED DESCRIPTION OF THE PREFERRED EMBODIMENTS

Figure 1:
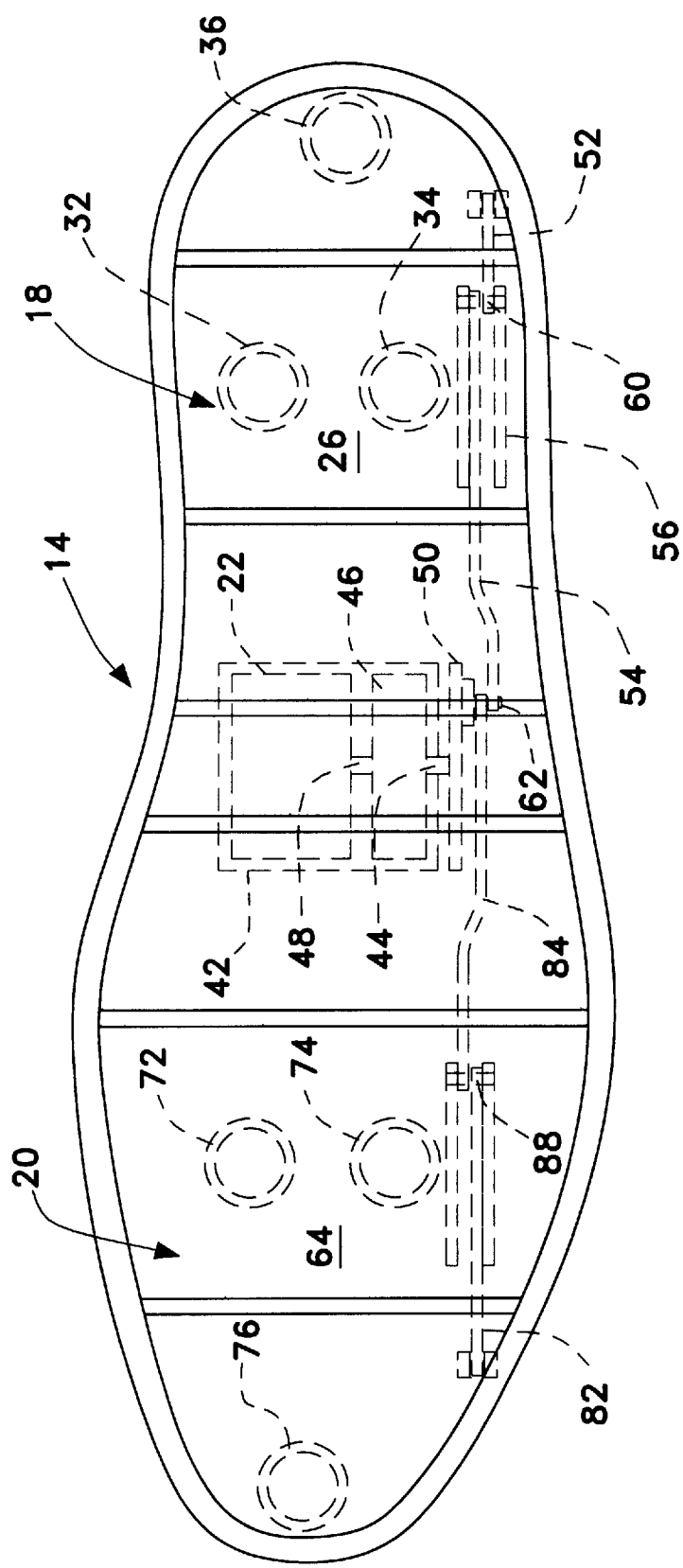
FIG. 1 is a plan view of the sole of a first embodiment of an electrical energy generating footwear item according to the present invention.

Referring to FIGS. 1–22, the present invention is a human powered electrical generation system 10 which includes a footwear item 12 having a sole 14 and an upper 16. The upper 16 is made in a form that can be worn on the human foot. As an example, the upper 16 can be in the form of a boot. The sole 14 has a heel portion 18 and a toe portion 20. An electrical energy generator 22 is incorporated into the sole 14 in the portion of the sole 14 which falls under the arch of the foot. Thus the generator 22 is positioned intermediate the heel and toe portions 18 and 20. The human powered electrical generation system 10 further includes powering means 24 for converting compression of at least one of the heel and toe portions 18 and 20 into mechanical energy and powering the electrical energy generator 22 using this mechanical energy.

Referring to FIGS. 1, 2A, and 2B, a first embodiment of the powering means 24 can be seen. In the embodiment of FIGS. 1, 2A, and 2B, the heel portion 18 of the sole 14 has a top wall 26 and a bottom wall 28. The top wall 26 and the bottom wall 28 generally extend in parallel planes such that there is a gap between the walls 26 and 28. A collapsible enclosure 30, somewhat resembling a bellows, encloses the space between the walls 26 and 28. The walls 26 and 28 are made of a rigid or semi-rigid material which can hold its shape under the types of stresses that would be expected to be encountered by footwear. Many well known plastics, metals, and composites would be suitable for use in the fabrication of the walls 26 and 28, and a number of such materials are already in use in the footwear industry.

The walls 26 and 28 of the heel portion 18 are segmented and can flex at specific joints 38 and 40 such that the bottom wall 28 and the top wall 26 can be moved relative to one another so as to vary the gap between the top and bottom walls 26 and 28. Springs 32, 34, and 36 bias the walls 26 and 28 away from each other such that the walls 26 and 28 return to the state of having the maximum gap therebetween when the heel portion 18 of the sole 14 is lifted off the ground.

The generator 22 is housed in a housing 42 which is positioned in the portion of the sole 14 that is located under the arch of the wearer's foot. A rotatably supported shaft 44 projects from the housing 42. The shaft 44 is the input shaft to the gearbox 46 which is also housed in the housing 42. The gearbox 46 turns the shaft 48 of the generator 22 at a higher speed than the rate at which the shaft 44 rotates. Gearboxes such as gearbox 46 are well known and are not described in detail herein. Rotation of the generator shaft 48 causes the electrical energy generator 22 to produce electrical energy.

In the embodiment of FIGS. 1, 2A, and 2B, the powering means 24 includes a crank wheel 50 which is rotatably supported near the electrical energy generator 22 and is coupled, via the gearbox 46, to the generator shaft 48 such that rotation of the crank wheel 50 causes the rotation of the generator shaft 48. This result is accomplished by fixing the crank wheel 50 to the shaft 44 such that the two rotate together as a unit.

The powering means 24 further includes a pair of linkage bars 52 and 54 and a slotted plate 56 disposed in the heel portion 18. The plate 56 projects from the middle segment of the top wall 26. The plate 56 has an elongated slot 58 which extends substantially parallel to the adjacent portion of the top wall 26. A pivot pin 60 is slidably supported by the slot 58 such that the pivot pin 60 can move slidably along the length of the slot 58. A crank pin or throw 62 is eccentrically fixed to the crank wheel 50.

The first linkage bar 52 has a first end and a second end. The first end of the first linkage bar 52 is pivotally attached to the segment of the bottom plate 28 which is farthest from the housing 42. The second linkage bar 54 also has a first end and a second end. The first end of the second linkage bar 54 is pivotally attached to the second end of the first linkage bar 52 by the pivot pin 60. The pivot pin 60 passes through the first end of the second linkage bar 54 and the second end of the first linkage bar 52 to form a pivotal attachment between the first end of the second linkage bar 54 and the second end of the first linkage bar 52. By virtue of the fact that the pivot pin 60 also passes through the slot 58, the pivotal attachment between the first end of the second linkage bar 54 and the second end of the first linkage bar 52 is capable of moving slidably along the slot 58.

The second end of the second linkage bar 54 is pivotally supported by the crank throw 62. From the structure just described, it should be readily apparent that movement of the bottom plate 28 of the heel portion 18 and the top plate 26 of the heel portion 18 toward one another due to application of compressive forces to the heel portion 18 causes linear movement of the first end of the second linkage bar 54 along the slot 58. As the first end of the second linkage bar 54 moves toward the housing 42, the second linkage bar 54 causes the application of a force to the crank throw 62 which in turn causes rotational motion of the crank wheel 50 and consequently results in the production of electrical energy by the electrical energy generator 22.

Similar to the heel portion 18, the toe portion 20 has a top wall 64 and a bottom wall 66. The walls 64 and 66 are segmented and can flex at specific joints 68 and 70 such that the bottom wall 66 and the top wall 64 can move relative to one another such that the gap between the top and bottom walls 64 and 66 can vary. Springs 72, 74, and 76 bias the walls 64 and 66 toward each other such that the walls 64 and 66 return to the state of having the minimum gap therebetween when the toe portion 20 of the sole 14 is lifted off the ground. As with the heel portion, a collapsible enclosure 78, somewhat resembling a bellows, encloses the space between the walls 64 and 66.

The structure provided between the walls 64 and 66 forms an additional part of the powering means 24. The structure provided between the walls 64 and 66 includes a second slotted plate 80 and linkage bars 82 and 84. The second plate 80 projects from the middle segment of the bottom wall 66 of the toe portion 20. The second plate 80 has a slot 86 which extends parallel to the adjacent segment of the bottom wall 66 of the toe portion 20.

A second pivot pin 88 is slidably supported by the slot 86. The third linkage bar 82 has a first end and a second end. The first end of the third linkage bar 82 is pivotally attached to the segment of the top wall 64 which is closest to the point or tip of the toe portion 20 (i.e. the segment of the top wall 64 which is positioned directly below the tips of a wearer's toes). The fourth linkage bar 84 also has a first end and a second end. The first end of the fourth linkage bar 84 is pivotally attached to the second end of the third linkage bar 82 by the second pivot pin 88 to form a pivotal attachment between the first end of the fourth linkage bar 84 and the second end of the third linkage bar 82. Given that the pivot pin 88 is slidably supported by the slot 86, the pivotal attachment between the fourth linkage bar 84 and the third linkage bar 82 is capable of moving slidably along the second slot 86. The second end of the fourth linkage bar 84 is pivotally supported by the crank throw 62.

When the sole 14 is lifted off the ground the sole 14 will be in the configuration illustrated in FIG. 2A. In normal walking the heel impacts the ground first and then the toe. As the wearer of the footwear item 12 takes a step, the heel portion 18 contacts the ground first and is compressed as shown in FIG. 2B. As the heel portion 18 is compressed, the first end of the linkage bar 52 moves toward the top wall 26. This movement causes the pivot pin 60 to slide along the slot 58 toward the housing 42. As the pivot pin 60 moves toward the housing 42, the linkage bar 54 is pushed toward the toe portion 20 and in turn pushed on the crank throw 62 causing the crank wheel 50 to rotate in the clockwise direction in the view illustrated in FIG. 2B. As the crank wheel 50 rotates, the crank throw 62 pushes the linkage bar 84 toward the tip of the toe portion 20. Movement of the linkage bar 84 toward the tip of the toe portion 20 causes the pivot pin 88 to slide along the slot 86 toward the tip of the toe portion 20. Movement of the pivot pin 88 toward the tip of the toe portion 20 causes the linkage bar 82 to pivotally move to assume a lesser deviation from the vertical direction and to simultaneously push the walls 64 and 66 apart from one another. Thus, as the crank wheel 50 rotates from the position shown in FIG. 2A to the position shown in FIG. 2B, the walls 64 and 66 are pushed apart from one another storing energy in the form of tension in the springs 72, 74, and 76.

When the heel portion 18 is lifted off the ground, the springs 72, 74, and 76 bring the walls 66 and 64 back toward each other. As the walls 66 and 64 move closer together, the linkage bar 82 pushes on the pin 88 and causes the pin 88 to slide along the slot 86 toward the housing 42. The sliding pin 88 pushes on the linkage bar 84 which in turn pushes on the crank throw 62. The action of the linkage bar 84 on the crank throw 62 causes the crank wheel 50 to make a complete revolution back to the position shown in FIG. 2A. Placing the toe portion 20 on the ground immediately after lifting the heel portion 18, which would be the case in the normal heel to toe walking stride, aids in the return stroke of the linkage bar 84 back to the position shown in FIG. 2A. Thus, normal heel to toe walking will cause the rotation of the crank wheel 50. As was previously stated, the crank wheel 50 is coupled to the generator 22 via the gearbox 46 such that the rotation of the crank wheel 50 will cause the rotation of the generator shaft 48, thereby resulting in the production of electrical energy by the electrical energy generator 22.

In a preferred embodiment, each of the pins 60 and 88 is slidably supported at both ends by slotted plates. Pivot pin 60 is supported by slotted plate 56 and a second slotted plate (not shown) which are parallel to one another and are superimposed in the side views shown in FIGS. 2A and 2B. Similarly, pivot pin 88 is supported by slotted plate 80 and another slotted plate (not shown) which are parallel to one another and are superimposed in the side views shown in FIGS. 2A and 2B.

Figure 3:
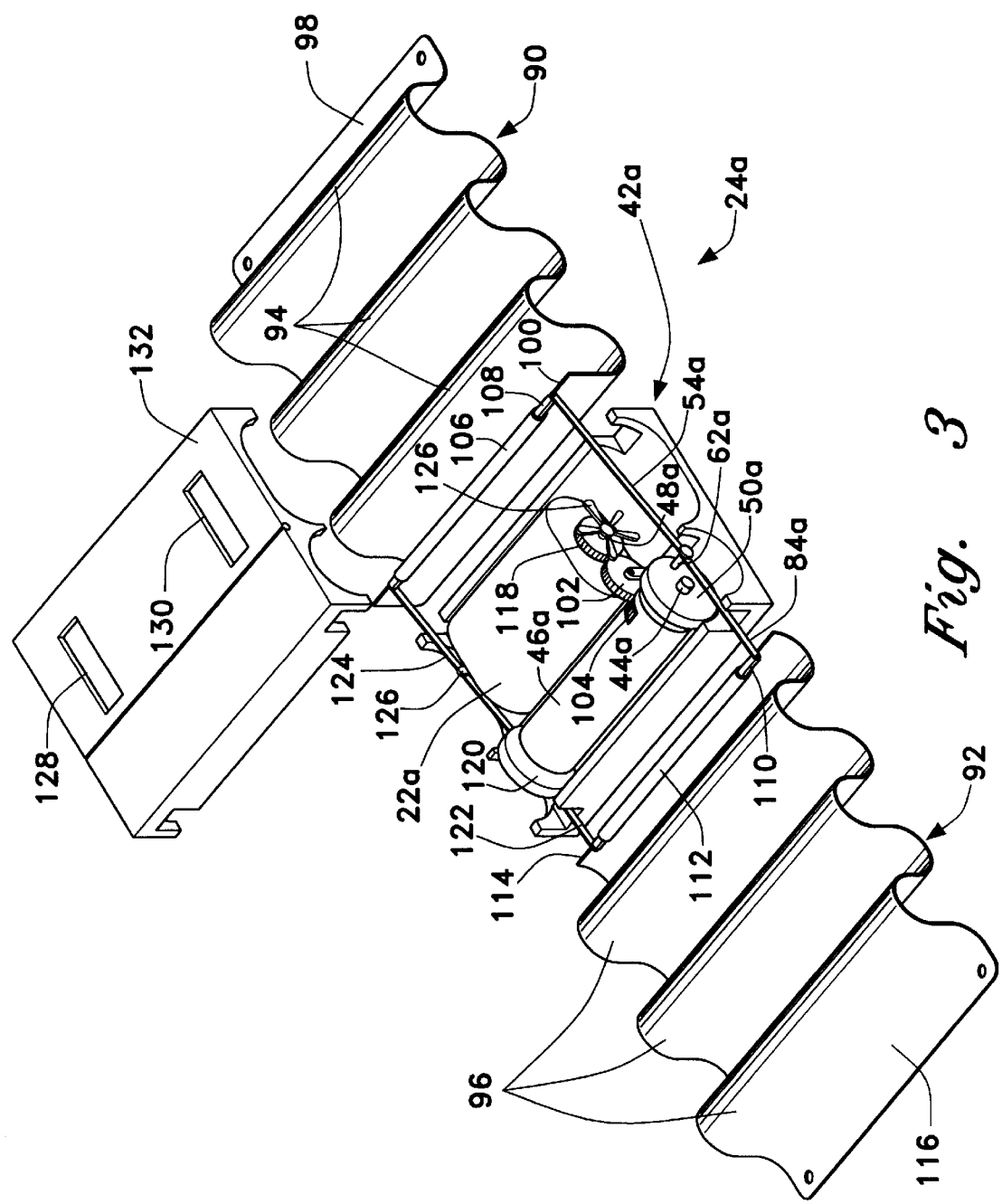
FIG. 3 is a fragmentary perspective view of the mechanism for converting walking movement to electrical energy used in a second embodiment of an electrical energy generating footwear item according to the present invention.

Referring to FIG. 3, a second embodiment of the powering means 24a can be seen. The powering means 24a includes a pair of corrugated springs 90 and 92 which are linked to crank throw 62a by linkage bars 54a and 84a, respectively. The powering means 24a is intended to be installed in the sole of a footwear item similar to that illustrated in FIGS. 2A and 2B. The corrugated spring 90 is designed for installation in the heel portion 18 between the walls 26 and 28, and the corrugated spring 92 is designed to be installed in the toe portion 20 between the walls 66 and 64. As the gap between the top and bottom walls of either the heel or the toe portion decreases, each corrugation in the respective corrugated spring is caused to change its dimension in the direction defined substantially by the length of the sole 14 which extends along the axis running from the heel portion of the sole toward the toe portion of the sole. An alternative housing 42a, housing an alternative gearbox 46a and an alternative generator 22a, would take the place of the housing 42 under the arch of the wearer's foot. The housing 42a, the gearbox 46a, and the generator 22a are functionally identical to the housing 42, the gearbox 46, and the generator 22. The housing 42a, the gearbox 46a, and the generator 22a are provided merely to illustrate an alternative arrangement which places the gearbox and the generator side by side instead of coaxially in tandem.

The corrugated spring 90 has a plurality of corrugations 94, a fixed end 98 and a free end 100. The fixed end 98 is fixed to the bottom wall 28 by glue, screws, rivets, or clamps (not shown). The corrugated spring 90 is placed intermediate the top wall 26 and the bottom wall 28 such that when the bottom wall 28 of the heel portion 18 and the top wall 26 of the heel portion 18 move toward one another, the plurality of corrugations 94 are relatively flattened causing each of the corrugations 94 to spread out horizontally. Thus, compression of the heel portion 18, due for example to the heel being placed on the ground by a wearer during walking, would cause the free end 100 of the corrugated spring 90 to move horizontally toward the housing 42a.

A sleeve 106 is fixed to the free end 100 of the corrugated spring 90. A shaft 108 passes through the sleeve 106 and pivotally engages the first end of the linkage bar 54a. The second end of the linkage bar 54a is pivotally supported by the crank throw 62a. The crank throw 62a is eccentrically fixed to the crank wheel 50a which is rotationally supported near the generator 22a. As the free end 100 of the corrugated spring 90 moves toward the housing 42a, the linkage bar 54a pushes on the crank throw 62a causing the crank wheel 50a to rotate.

The crank throw 62a also pivotally supports the second end of the linkage bar 84a. The first end of the linkage bar 84a is pivotally attached to a rod 110 which is supported by a sleeve 112 which is fixed to the free end 114 of the corrugated spring 92. The corrugated spring 92 is positioned intermediate the top wall 64 of the toe portion 20 and the bottom wall 66 of the toe portion 20. The second corrugated spring 92 has a second plurality of corrugations 96 and also a fixed end 116 which is fixed to the segment of the bottom wall 66 nearest the tip of the toe portion 20. The fixed end 116 can be fixed to the bottom wall 66 using any well known means including screws, rivets, clamps, etc.

As the linkage bar 54a pushes on the crank throw 62a and causes the crank wheel 50a to rotate, the crank throw 62a will push the linkage bar 84a toward the tip of the toe portion 20. In the process of moving toward the tip of the toe portion 20, the linkage bar 84a will compress the corrugated spring 92 storing some potential energy in the spring 92. During the compression process, the peak to peak distance of the corrugations 96 is decreased while the height of the corrugations is increased pushing the walls 66 and 64 apart.

As the heel portion 18 is lifted off the ground, the corrugated spring 92 will push back on linkage bar 84a which in turn pushes back on the crank throw 62a. The force of the linkage bar 84a on the crank throw 62a causes the continued rotation of the crank wheel 50a back to its starting position such that the crank wheel 50a completes one revolution. Pressure on the toe portion 20 immediately after lifting of the heel, as would be encountered in normal heel-to-toe walking, aides in pushing the crank throw 62a so as to cause the crank wheel 50a to complete one revolution. Thus, normal heel-to-toe walking causes the continued rotation of the crank wheel 50a.

As with the first embodiment, the crank wheel 50a is rotatably supported by the input shaft 44a of the gearbox 46a near the electrical energy generator 22a. Power is taken from the gearbox 46a by an idler or pinion gear 102 which engages a gear within the gearbox 46a through a cutout 104 in the gearbox 46a. The pinion gear 102 is in mesh with a gear 118 which is fixed to the generator shaft 48a. Therefore, the crank wheel 50a is coupled to the generator shaft 48a via the gearbox 46a, and rotation of the crank wheel 50a causes the rotation of the generator shaft 48a. As with the previous embodiment, rotation of the generator shaft 48a causes production of electrical energy by the generator 22a.

The gearing in the gearbox 46a can be of the standard or of the epicyclic type. Again, the operation of gearboxes being very well known, the inner workings of the gearbox 46a will not be described here in detail.

To balance the stresses applied to the gearbox 46a, a second crank wheel 120 is rotatably supported near the end of the gearbox 46a opposite the end near which the crank wheel 50a is positioned. The crank wheel 120 is coaxial with the crank wheel 50a and has a crank throw (not shown) which is identical to the crank throw 62a and is coaxial with the crank throw 62a. A linkage bar 122 extends from the free end 114 of the corrugated spring 92 to the crank throw of the wheel 120, and a linkage bar 124 extends from the free end 100 of the corrugated spring 90 to the crank throw of the wheel 120. The linkage bars 122 and 124 and the crank wheel 120 are mirror images of the linkage bars 84a and 54a and the crank wheel 50a, respectively, which have all been already described in detail.

As an option, a pair of cooling fans 126 can be provided at each end of the shaft 48a. The cooling fans 126 are fixed to the shaft 48a and therefore rotate with the shaft 48a. The cooling fans 126 circulate air past the generator 22a to cool the generator. The fans 126 draw air from the space between the top and bottom walls of the heel and toe portions 18 and 20 and then exhaust the air through the openings 128 and 130 in the top half 132 of the housing 42a.

In the embodiments of FIGS. 2A, 2B, and 3 the heel and toe portions 18 and 20 must be vented so that the top and bottom walls of each portion can move toward one another under the weight of the wearer without the buildup of air pressure impeding the movement of the top and bottom walls of each of the heel and toe portions 18 and 20 relative to each other. The openings 128 and 130 shown in FIG. 3 can serve this purpose, or other openings can be provided in the top walls 64 and 26 of the toe and heel portions, respectively. These openings then can communicate with a gap between the top of the sole 14 and the bottom of the uppers 16. This gap is then vented to the atmosphere via the holes 134 and 136 shown in FIG. 10.

Figure 4B:
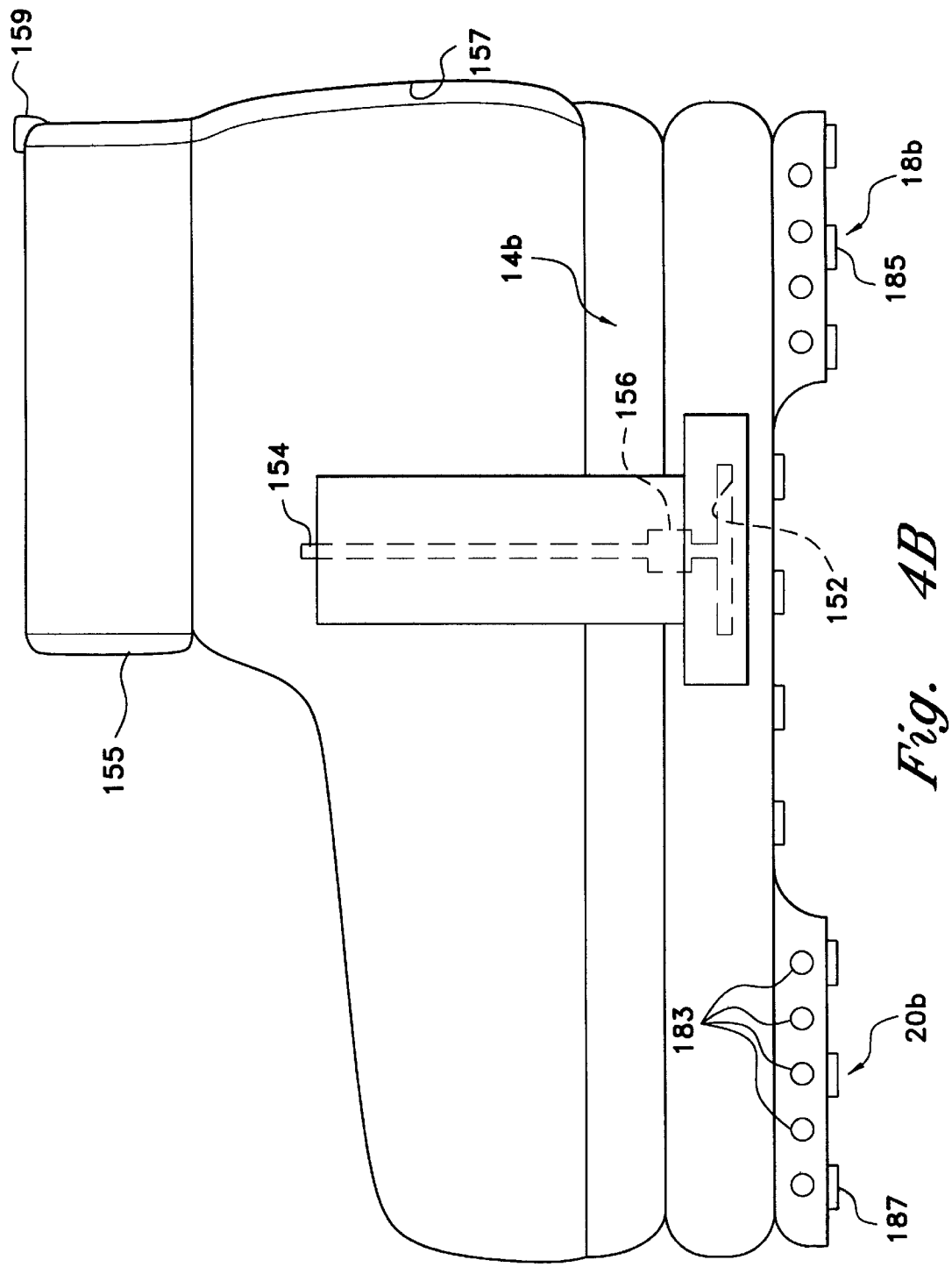
FIG. 4B is a side elevational view of the third embodiment of an electrical energy generating footwear item according to the present invention, which uses pneumatic actuation to power a generator.
Figure 6:
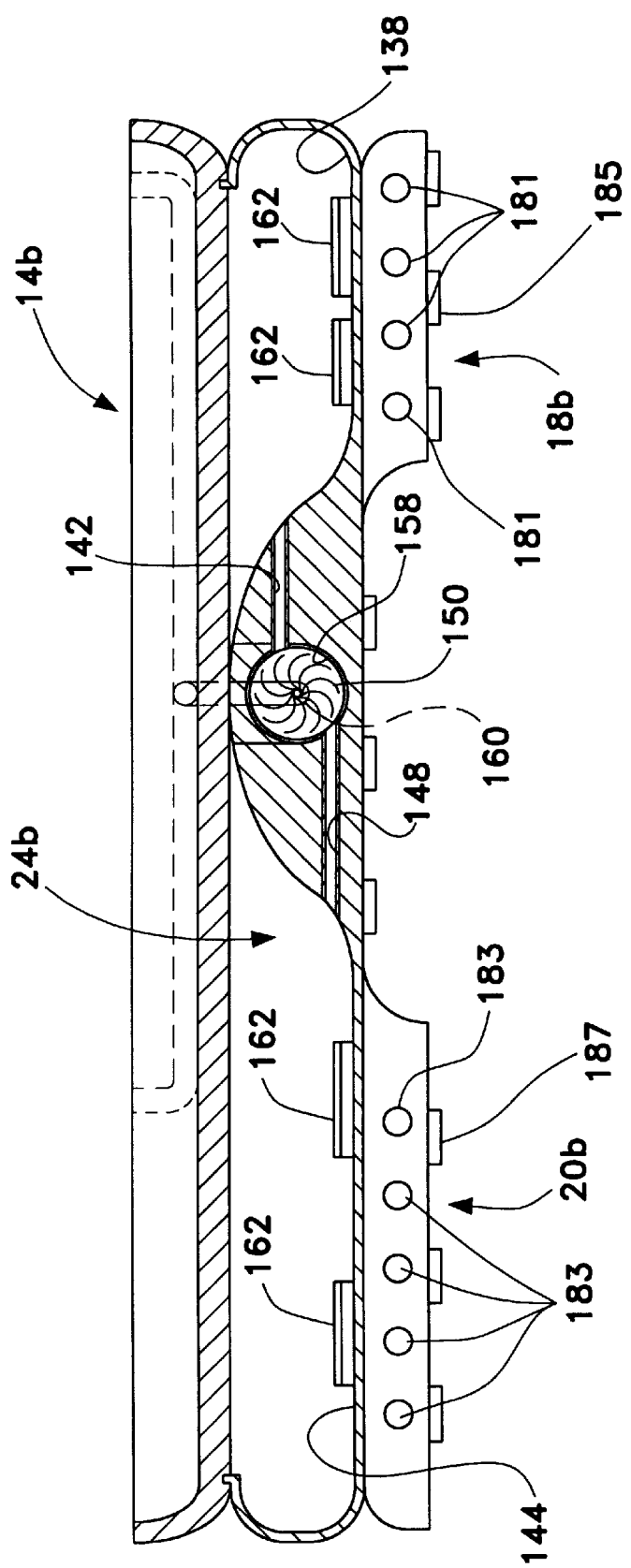
FIG. 6 is a fragmentary side view of the sole of a third embodiment of an electrical energy generating footwear item according to the present invention, which uses pneumatic actuation to power a generator.

Referring to FIGS. 4A, 4B, and 6, a third embodiment of the powering means 24b can be seen. The powering means 24b is of a pneumatic type. The heel portion 18b of the sole 14b has a flexible air chamber 138 having a first air inlet 140 and a first air outlet 142. The flexible air chamber 138 is squeezed when the heel portion 18b of the sole is subjected to compressive forces, as is the case when a wearer of the footwear item shifts his or her weight to his or her heel.

The toe portion 20b of the sole 14b has a second flexible air chamber 144. The flexible air chamber 144 has a second air inlet 146 and a second air outlet 148. The second flexible air chamber 144 is squeezed when the toe portion 20b of the sole is subjected to compressive forces, as for example happens when a wearer applied pressure to his or her toe while walking. As with the embodiments of FIGS. 2A and 2B, the electrical energy generator 22b has a generator shaft 48b whose rotation causes the electrical energy generator 22b to produce electrical energy. The generator 22b is coupled to a pneumatic turbine 150 via a gearbox 46b. The turbine 150 is fixed to the input shaft 44b of the gearbox 46b. The generator 22b and gearbox 46b are similar to the generator 22 and the gearbox 46 and function in the same way, therefore the statements made in reference to the generator 22 and the gearbox 46 are also applicable to the generator 22b and the gearbox 46b.

A first conduit 152 communicates with the first air inlet 140 and with the second air inlet 146. A second conduit 154 branches off from the conduit 152 intermediate the first air inlet 140 and the second air inlet 146. The conduit 154 allows the flexible air chambers 138 and 144 to communicate with atmospheric air surrounding the footwear item.

A one-way valve 156 is provided in the second conduit 154. The one-way valve 156 acts to allow air movement into the first and second flexible air chambers 138 and 144 only when there is lower air pressure within the first and second flexible air chambers 138 and 144 as compared to the atmospheric pressure of the air surrounding the footwear item. The pneumatic turbine 150 is rotatably supported near the electrical energy generator by the input shaft 44b of the gearbox 46b. As has already been explained, the pneumatic turbine 150 is coupled to the generator shaft 48b such that rotation of the pneumatic turbine 150 causes rotation of the generator shaft 48b and consequently production of electrical energy by the generator 22b. The pneumatic turbine 150 has a housing 158. The turbine housing 158, and thus the pneumatic turbine 150, communicates with the first and second air outlets 142 and 148 such that air issuing from the first and second air outlets 142 and 148 impinge upon the blades of the pneumatic turbine 150 and cause the pneumatic turbine to rotate. To impart rotational motion to the turbine 150, the air outlets 142 and 148 should meet the housing 158 such that the air outlets 142 and 148 are offset from the center of rotation of the turbine 150. The air outlets 142 and 148 may even be positioned such that they are directed approximately along a tangent to the housing 158. The air impinging on the pneumatic turbine 150 exits the housing 158 from a central turbine housing outlet 160.

In operation, compression of either of the first and second flexible air chambers 138 and 144, for example as would occur during normal heel-to-toe walking, causes the air pressure in both chambers 138 and 144 to go up because the two chambers are connected by the conduit 152. The resultant high pressure in both chambers 138 and 144 causes air to be issued from both the first and second air outlets 142 and 148 into the turbine housing 158. The air flowing into the turbine housing 158 causes rotational motion of the pneumatic turbine 150 and consequently causes the production of electrical energy by the electrical energy generator 22b.

The embodiment illustrated in FIGS. 4A, 4B, and 6, also shows a feature that can be incorporated in any of the various embodiments of the footwear item 12. This feature is a means for heating or cooling the wearer's foot. These means for heating or cooling includes a plurality of thermoelectric diodes 162 fixed to the interior of the chambers 138 and 144. The thermoelectric diodes 162 can be used to selectively heat or cool the air in the chambers 138 and 144 by changing the polarity of the current applied to the thermoelectric diodes 162 under the control of a user. The electrical energy for powering the thermoelectric diodes 162 preferably comes from the generator 22b.

During normal walking the chambers 138 and 144 draw air in from the ambient atmosphere through the valve 156. The air is selectively heated or cooled inside the chambers 138 and 144. The air is then pumped through the turbine 150 and through the turbine outlet 160 as the chambers 138 and 144 get squeezed during the normal walking process. The air passing through the turbine outlet 160 is conducted to a network of interconnected tubes 164, 166, 168, 170, and 172 which distribute the air to a series of openings 174, 176, 178, and 180 formed in the bottom of the footwear upper 16. Thus the air heated or cooled by the thermoelectric diodes 162 is pumped into the interior of the footwear item 12 to heat or cool the wearer's foot.

Depending on whether the thermoelectric diodes 162 are heating or cooling the air in the chambers 138 and 144, the thermoelectric diodes 162 will have to reject heat to or take up heat from the ambient atmosphere. The vent holes 181 and 183 allow air to circulate between the chambers 138 and 144 and the treads 185 and 187, respectively, and thus facilitate the exchange of heat between the thermoelectric diodes 162 and the ambient atmosphere.

The cooled or heated air pumped into the upper of the footwear item 12 can be used to heat or cool the whole body of the wearer by providing an appropriately designed garment. The appropriate garment should at least encase both the wearer's torso and the wearer's legs. The hem of each leg of the pants portion of the garment should be connected to the footwear upper 16 about the ankle region, and the connection should be sealed from the ambient air such that heated or cooled air pumped into the footwear upper 16 will be conducted up the pant leg. Such a garment could be of the coverall type where the pants portion and the portion covering the torso are continuous such that heated or cooled air pumped into the pants portion will flow into the torso portion. Alternatively, the torso can be separate from the pants portion as long as the two portions are connected about the waist and the connection is sealed from the atmosphere such that air will be conducted from the pants portion to the torso portion without interruption.

In addition, FIG. 4B shows a pneumatic cuff 155 at the top of the upper of the footwear item 12. In FIG. 4B, the air passages 164 to 172 are replaced entirely or in part by a tube 157 which provides for fluid communication between the turbine outlet 160 and the pneumatic cuff 155. A one-way valve (not shown) is provided in the tube 157 to ensure that air does not flow from the cuff 155 back toward the turbine housing 158. As an alternative to the one-way valve, a selected portion of the anatomy of the wearer's foot may be used for preventing air flow from the cuff 155 back to the turbine housing 158. The cuff 155 is provided with a pressure relief valve 159. The pressure relief valve 159 is set to open when the pressure inside the cuff 155 exceeds a predetermined value. The predetermined pressure at which the relief valve opens is selected such that the cuff 155 fits snugly around the wearer's ankle, but such that the cuff 155 will not interfere with blood flow to the wearer's foot or cause discomfort to the wearer.

As the wearer walks, air is pumped from the chambers 138 and 144, through the turbine housing 158, and into the cuff 155. Thus the cuff is automatically inflated and maintained at the predetermined pressure at which the pressure relief valve 159 is set to open. The cuff 155 forms a seal about the wearer's ankle or lower leg, isolating the interior of the footwear upper 16 from the outside air. The cuff 155 has many benefits including preventing snow and rain from entering the footwear 12 and offering a novel method for holding a footwear item on a wearer's foot without the need for shoe laces. By forming seal around the ankle, the cuff 155 allows a vacuum to be created in the footwear upper 16 by any well known means in order to enhance blood flow to the feet for diabetic users. With appropriate modifications the cuff 155 may be used as part of a system for monitoring the wearer's blood pressure and vital signs. When necessary, the inlet to the conduit 154 can be arranged such that it is in fluid communication with the interior of the footwear upper 16. This arrangement allows air to be recirculated within the footwear upper, thus providing for greater temperature retention within the footwear upper.

Referring to FIGS. 5A, 5B, and 5C, embodiments of an insole 161 and 161*a* usable alone or with the electrical energy generating footwear item 12 can be seen. The insole 161 has a plurality of suction cups 163 that can cause the insole to adhere to the bottom of a person's foot. When used alone, the suction cups 163 allow the insole 161 to be used as a strapless sandal or an upperless slipper. The insole 161*a* is similar to the insole 161 except that, rather than being formed directly in the top surface of the insole, the suction cups 163*a* are supported at the tips of stalks 165 which project from the bottom of a depression 167 formed in the top surface of the insole 161*a*. Either insole 161 or 161*a* may be inserted into the footwear item 12 shown in FIG. 4B. The vacuum generated against the wearer's skin by the suction cups 163 or 163*a* enhances the flow of blood to the bottoms of the feet. The enhanced flow of blood would be of particular benefit to diabetics who commonly suffer from the degeneration of their lower extremities due to poor blood flow caused by the deterioration of their capillaries.

Referring to FIGS. 7A and 7B, a further embodiment of a pneumatic means 24*d* for powering a generator 22*d*, housed in the sole of the footwear 12, can be seen. The heel portion 18*d* of the sole 14*d* has a flexible air chamber 138*d* having a first air inlet 140*d* and a first air outlet 142*d*. The flexible air chamber 138*d* is squeezed when the heel portion 18*d* of the sole is subjected to compressive forces, as is the case when a wearer of the footwear item shifts his or her weight to his or her heel.

The toe portion 20*d* of the sole 14*d* has a second flexible air chamber 144*d*. The flexible air chamber 144*d* has a second air inlet 146*d* and a second air outlet 148*d*. The second flexible air chamber 144*d* is squeezed when the toe portion 20*d* of the sole is subjected to compressive forces, as for example happens when a wearer applied pressure to his or her toe while walking. As with the embodiments of FIGS. 2A and 2B, the electrical energy generator 22*d* has a generator shaft 48*d* whose rotation causes the electrical energy generator 22*d* to produce electrical energy. The generator 22*d* is coupled to a pneumatic turbine 150*d*. If necessary, the generator 22*d* can be coupled to the pneumatic turbine 150*d* via a gearbox 46*d*. The turbine 150*d* is fixed to the input shaft 44*d* of the gearbox 46*d*. Alternatively, the turbine 150*d* can be fixed to the input shaft of the generator 22*d* directly, if a gearbox is not necessary. The generator 22*d* and gearbox 46*d* are similar to the generator 22 and the gearbox 46 and function in the same way, therefore the statements made in reference to the generator 22 and the gearbox 46 are also applicable to the generator 22*d* and the gearbox 46*d*.

A pair of conduits 152*d* allow fluid communication between the first air inlet 140*d* and the second air inlet 146*d*. The conduits 152*d* are also in fluid communication with the outlet of a one-way valve 156*d*.

The one-way valve 156*d* acts to allow air movement into the first and second flexible air chambers 138*d* and 144*d* only when there is lower air pressure within the first and second flexible air chambers 138*d* and 144*d* as compared to the atmospheric pressure of the air surrounding the footwear item. The pneumatic turbine 150*d* is rotatably supported near the electrical energy generator by the input shaft 44*d* of the gearbox 46*d*. As has already been explained, the pneumatic turbine 150*d* is coupled to the generator shaft 48*d* such that rotation of the pneumatic turbine 150*d* causes rotation of the generator shaft 48*d* and consequently production of electrical energy by the generator 22*d*. The pneumatic turbine 150*d* has a housing 158*d*. The turbine housing 158*d*, and thus the pneumatic turbine 150*d*, communicates with the first and second air outlets 142*d* and 148*d* such that air issuing from the first and second air outlets 142*d* and 148*d* impinge upon the blades of the pneumatic turbine 150*d* and cause the pneumatic turbine to rotate. To impart rotational motion to the turbine 150*d*, the air outlets 142*d* and 148*d* should meet the housing 158*d* such that the air outlets 142*d* and 148*d* are offset from the center of rotation of the turbine 150*d*. The air outlets 142*d* and 148*d* may even be positioned such that they are directed approximately along a tangent to the housing 158*d*. The air impinging on the pneumatic turbine 150*d* exits the housing 158*d* and is distributed within the interior of the footwear upper in the same manner as discussed with reference to the embodiment of FIGS. 4A and 6.

The turbine housing 158*d*, the gearbox 46*d*, and the generator 22*d* are housed in an integral manner in the same housing 169. The housing 169 has an elliptical or bi-convex shape when viewed from the side such that the housing 169 can provide arch support for the foot of a person wearing the footwear item 12 which employs the system of FIGS. 7A and 7B.

In operation, compression of either of the first and second flexible air chambers 138d and 144d, for example as would occur during normal heel-to-toe walking, causes the air pressure in both chambers 138d and 144d to go up because the two chambers are connected by the conduits 152d. The resultant high pressure in both chambers 138d and 144d causes air to be issued from both the first and second air outlets 142d and 148d into the turbine housing 158d. The air flowing into the turbine housing 158d causes rotational motion of the pneumatic turbine 150d and consequently causes the production of electrical energy by the electrical energy generator 22d. In all other respects the embodiment of FIGS. 7A and 7B is identical to the embodiment of FIGS. 4A and 6. For example, the air passing through the turbine outlet 160 is conducted to a network of interconnected tubes 164, 166, 168, 170, and 172 which distribute the air to a series of openings formed in the bottom of the footwear upper 16.

Figure 8:
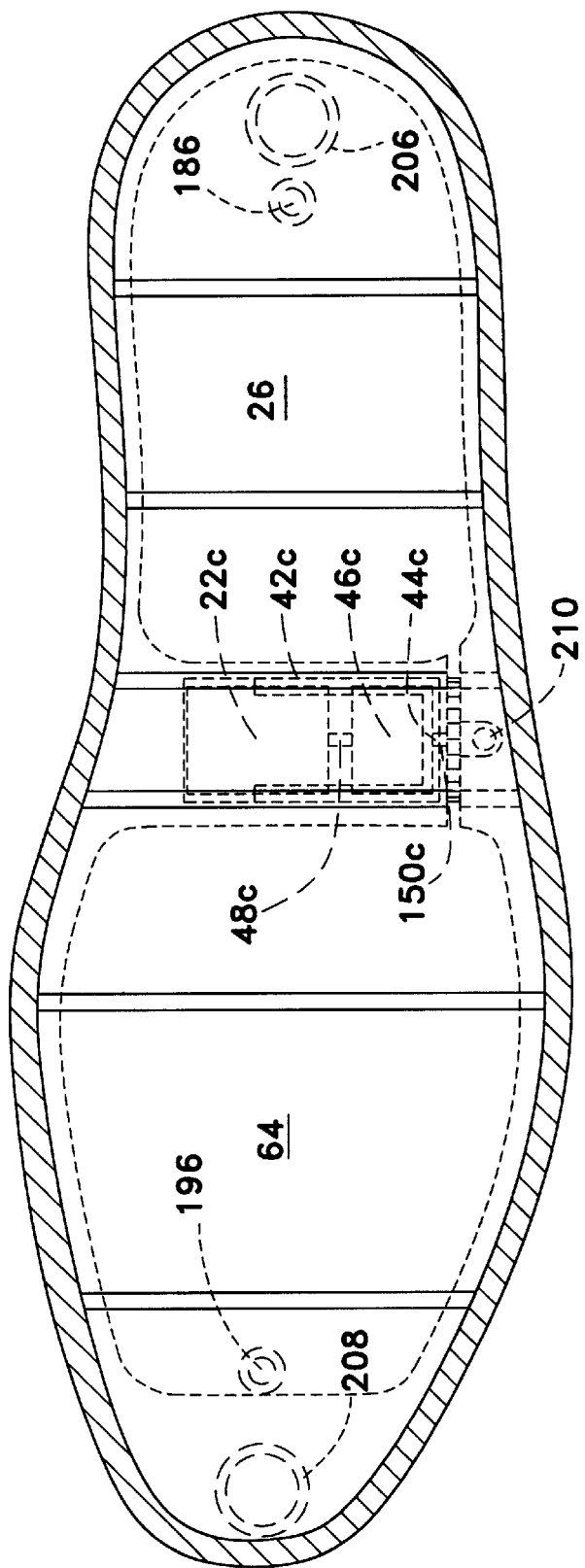
FIG. 8 is a plan view of the sole of a fifth embodiment of an electrical energy generating footwear item according to the present invention, which uses pneumatic actuation to power a generator.
Figure 9:
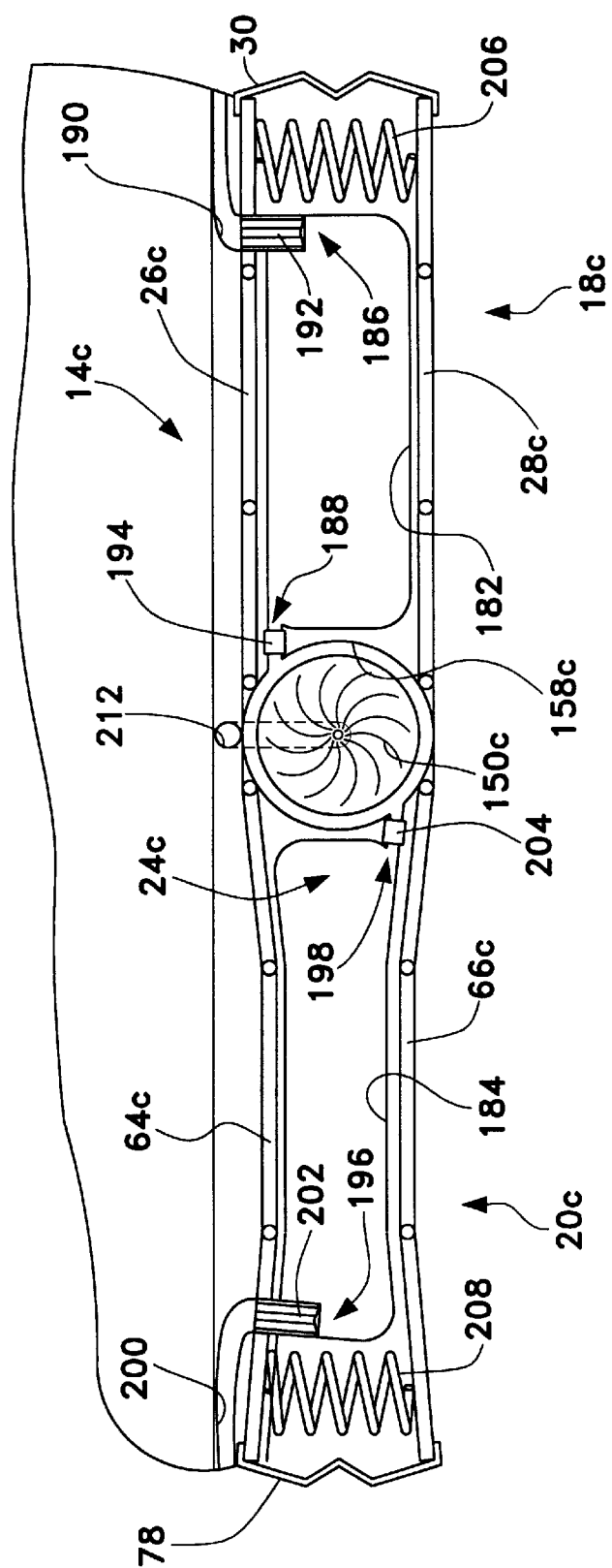
FIG. 9 is a fragmentary side view of the sole of the fifth embodiment of an electrical energy generating footwear item according to the present invention, which uses pneumatic actuation to power a generator.

Referring to FIGS. 8 and 9, a further pneumatic embodiment of the electrical energy generating footwear of the present invention can be seen. The embodiment of FIGS. 8 and 9 includes a sole 14c having a first flexible air chamber 182 and a second flexible air chamber 184. The first flexible air chamber 182 is positioned in heel portion 18c of the sole 14c intermediate top and bottom walls 26c and 28c. The second flexible air chamber 184 is positioned in toe portion 20c of the sole 14c intermediate top and bottom walls 64c and 66c. The walls 26c, 28c, 64c, and 66c are identical to the walls 26, 28, 64, and 66, respectively. The powering means 24c is identical to the pneumatic type powering means 24b. The collapsible enclosure 30 encloses the space between the walls 26c and 28c of heel portion 18c, and the collapsible enclosure 78 encloses the space between the walls 64c and 66c of the toe portion 20c.

The first flexible air chamber 182 has a first air inlet 186 and a first air outlet 188. A first conduit 190 communicates with the first air inlet 186 and with atmospheric air surrounding the footwear item 12. A first one-way valve 192 is provided in the first conduit 190. The first one-way valve 192 acts to allow air movement into the flexible air chamber 182 only when there is lower air pressure within the flexible air chamber 182 as compared to the atmospheric pressure of the air surrounding the footwear item 12. A second one-way valve 194 is provided at the first air outlet 188. The second one-way valve 194 acts to allow air movement out of the flexible air chamber 182 only when there is higher air pressure within the flexible air chamber 182 as compared to atmospheric pressure of air surrounding the footwear item 12.

When pressure is applied to the heel portion 18c the bottom wall 28c moves toward the top wall 26c, thus compressing the air chamber 182. As the flexible air chamber 182 is being squeezed, the air pressure in the chamber 182 goes up causing the inlet valve 192 to close and the outlet valve 194 to open. As the heel portion 18c is further compressed, air forcefully issues from the outlet 188. When the heel portion 18c is lifted off the ground, the spring 206 forces the top and bottom walls 26c and 28c apart and back to their original configuration. As the top and bottom walls 26c and 28c move apart, the air chamber 182 is allowed to expand. As the air chamber 182 expands, the inlet valve 192 opens and the outlet valve 194 closes to allow the air chamber 182 to draw air in through the inlet 186.

The second flexible air chamber 184 has a second air inlet 196 and a second air outlet 198. A second conduit 200 communicates with the air inlet 196 and with atmospheric air surrounding the footwear item 12. A third one-way valve 202 is provided in the conduit 200. The one-way valve 202 acts to allow air movement into the flexible air chamber 184 only when there is lower air pressure within the flexible air chamber 184 as compared to the atmospheric pressure of the air surrounding the footwear item 12. A fourth one-way valve 204 is provided at the air outlet 198. The one-way valve 204 acts to allow air movement out of the flexible air chamber 184 only when there is higher air pressure within the flexible air chamber 184 as compared to atmospheric pressure of air surrounding the footwear item 12.

When pressure is applied to the toe portion 20c the bottom wall 66c moves toward the top wall 64c, thus compressing the air chamber 184. As the flexible air chamber 184 is being squeezed, the air pressure in the chamber 184 goes up causing the inlet valve 202 to close and the outlet valve 204 to open. As the toe portion 20c is further compressed, air forcefully issues from the outlet 198. When the toe portion 20c is lifted off the ground, the spring 208 forces the top and bottom walls 64c and 66c apart and back to their original configuration. As the top and bottom walls 64c and 66c move apart, the air chamber 184 is allowed to expand. As the air chamber 184 expands, the inlet valve 202 opens and the outlet valve 204 closes to allow the air chamber 184 to draw air in through the inlet 196.

The embodiment of FIGS. 8 and 9 has an electrical energy generator 22c, a gearbox 46c, and a pneumatic turbine 150c which are identical to the electrical energy generator 22b, the gearbox 46b, and the pneumatic turbine 150 of the embodiment of FIGS. 4A, 4B, and 6. The electrical energy generator 22c has a generator shaft 48c whose rotation causes the electrical energy generator 22c to produce electrical energy. The generator 22c is coupled to the pneumatic turbine 150c via the gearbox 46c. The turbine 150c is fixed to the input shaft 44c of the gearbox 46c and rotates therewith. The generator 22c and gearbox 46c are housed in a housing 42c. The pneumatic turbine 150c is coupled to the generator shaft 48c such that rotation of the pneumatic turbine 150c causes the rotation of the generator shaft 48c and consequently the production of electrical energy by the generator 22c. The pneumatic turbine 150c has a housing 158c. The turbine housing 158c, and thus the pneumatic turbine 150c, communicates with the first and second air outlets 188 and 198 such that air issuing from the first and second air outlets 188 and 198 impinge upon the blades of the pneumatic turbine 150c and cause the pneumatic turbine to rotate.

To impart rotational motion to the turbine 150c, the air outlets 188 and 198 should meet the housing 158c such that the air outlets 188 and 198 are offset from the center of rotation of the turbine 150c. The air outlets 188 and 198 may even be positioned such that they are directed approximately along a tangent to the housing 158c. The air impinging on the pneumatic turbine 150c exits the housing 158c from a central turbine housing outlet 210. The outlet of the turbine housing 158c communicates with the opening 212 and is thus vented to the space between the top of the sole 14c and the bottom of the upper 16. The space between the top of the sole 14c and the bottom of the upper 16 is in turn vented to the atmosphere using holes (not shown) similar to holes 136 and 134 shown in FIG. 10.

In operation, when the footwear item is completely off the ground, both chambers 182 and 184 fill with air. As the wearer steps on his heel, the chamber 182 is compressed forcing air against the blades of the turbine 150c. The air issuing into the turbine housing 158c causes rotational motion of the pneumatic turbine 150c and consequently causes the production of electrical energy by the electrical energy generator 22c. As the wearer shifts his weight to the toe of the footwear item 12, the chamber 184 is compressed forcing air against the blades of the turbine 150c so as to continue the rotation of the turbine 150c and the production of electrical energy. The chamber 182 begins to fill with air as soon as the wearer lifts the heel of the footwear item 12 off the ground and the energy production cycle can be repeated.

Referring to FIG. 10, all the various embodiments of the footwear item 12 have uppers that resemble the upper 16 illustrated in FIG. 10. In all the various embodiments, electrical wire leads 214 and 216 carry the output of the generators 22, 22a, 22b, or 22c to a pair of conductive couplers 218 and 220. The couplers 218 and 220 are fixed to the upper 16 near the top of the upper and close to the location of the wearer's ankle. As an example, the couplers 218 and 220 can be conductive snaps of either the male or female type. The couplers 218 and 220 can be engaged by conductive snaps of the complimentary type to form an electrically conductive connection.

Referring to FIGS. 11–22, the present invention further includes a garment which has conductive pathways that distribute electrical energy to all locations on a wearer's body so that the electrical energy can be conveniently accessed at various locations on the wearer's body to power various appliances. The garment includes a pants portion 222 and an upper body portion 224.

The conductive pathways of the garment are in the form of conductive buses that are made of a plurality of parallel conductors that are insulated from each other and from the surrounding environment. The conductive buses are woven, sewn, or otherwise fixed to or within a garment. Each pant leg 226 has a conductive bus 228 running along the side of the pant leg from the hem, located near the ankle, to the waist. A conductive bus 230 encircles the waist. A conductive bus 232 encircles the neck. A conductive bus 234 extends from the waist bus 230 to the neck bus 232. A conductive bus 236 runs from the neck bus 232 along the top of each shoulder and down the side of each arm to the wrist or cuff of each sleeve. A conductive bus 238 encircles each wrist and is electrically interfaced with a respective one of the arm buses 236.

A selected pair of wires in each of the leg buses 228 terminate in couplers 240 and 242 that match the couplers 218 and 220. The couplers 240 and 242 connect to the couplers 218 and 220 of each footwear item to carry the output of the generators 22, 22a, 22b, or 22c to the waist bus 230. The generator output from each leg is coupled to a respective pair of wires within the waist bus 230. The generator output from each leg is then supplied to a respective power output conditioning circuit 244 (see FIG. 22) housed in the control panel housing 246 (see FIG. 20).

The power output conditioning circuits 244 convert the generator outputs to direct current that can used to power various appliances. The power output conditioning circuits 244 may include transformers, rectifiers, and capacitors and other electronics to produce the desired power output. Circuits such as circuits 244, which can condition the output of a generator and convert it to a direct current output, are well known and therefore the internal details of the circuits 244 is not presented here. The circuits 244 are connected in parallel to each other, and the combined output of the circuits 244 is connected to the terminals of a rechargeable battery 248. The positive terminal 250 of the battery 248, and thus the positive terminals of the power output circuits 244, is connected in parallel to on/off switches 252 and 254 which control the power supply to the left and right arm buses 236, respectively. The switches 252 and 254 are also housed in the control panel housing 246. The output from each of the switches 252 and 254 is connected to a respective wire in the waist bus 230. The negative terminals of the battery 248 and the circuits 244 are all connected to the same respective wire in the waist bus 230.

A wire in the conductive bus 234 connects the wire in the waist bus, which is connected to the negative battery terminal 251, to a wire in the neck bus 232. A second wire in the conductive bus 234 connects the output of switch 252 to a wire in the neck bus 232. A third wire in the conductive bus 234 connects the output of switch 254 to a wire in the neck bus 232. A wire 256 in the left arm bus 236 connects to the wire in the neck bus 232 which is connected to the negative terminal of the battery 248, and a second wire 258 in the left arm bus 236 connects to the wire in the neck bus 232 which is connected to the output of the switch 252. Similarly, a wire 260 in the right arm bus connects to the wire in the neck bus 232 which is connected to the negative terminal of the battery 248, and a second wire 262 in the right arm bus connects to the wire in the neck bus 232 which is connected to the output of the switch 254.

The wires 256 and 258 run the length of the left arm. Along the length of the wires 256 and 258 there are pairs of connectors 264 and 266 which are similar to couplers 218 and 220. Each of the connectors 264 is connected to the negative terminal 251 while each of the connectors 266 is connected to the output of the switch 252. Similarly for the right arm, the wires 260 and 262 run the length of the right arm. Along the length of the wires 260 and 262 there are pairs of connectors 268 and 270 which are similar to connectors 218 and 220. Each of the connectors 268 is connected to the negative terminal 251 while each of the connectors 270 is connected to the output of the switch 254. Each of the pairs of connectors 264 and 266 and each of the pairs of connectors 268 and 270 are covered by a protective flap 272 when each pair of connectors is not in use. Each protective flap 272 is made of an insulating material and is secured in place by, for example, a hook-and-loop fastener system.

Each of the wires 256 and 258 can be connected to a respective wire in the wrist bus 238 of the left wrist. More pairs of connectors 264 and 266 can then be provided on the wrist bus 238 of the left hand. Similarly, each of the wires 260 and 262 can be connected to a respective wire in the wrist bus 238 of the right wrist. More pairs of connectors 268 and 270 can then be provided on the wrist bus 238 of the right hand. If desired, a pair of wires in each of the leg buses 228 may also be connected to the terminals 250 and 251, with or without a switch such as switches 252 and 254. Then pairs of connectors similar to connectors 264 and 266 can be provided along the length of the leg buses 228 in order to allow for more and varied locations for the connection of various appliances.

Figure 14:
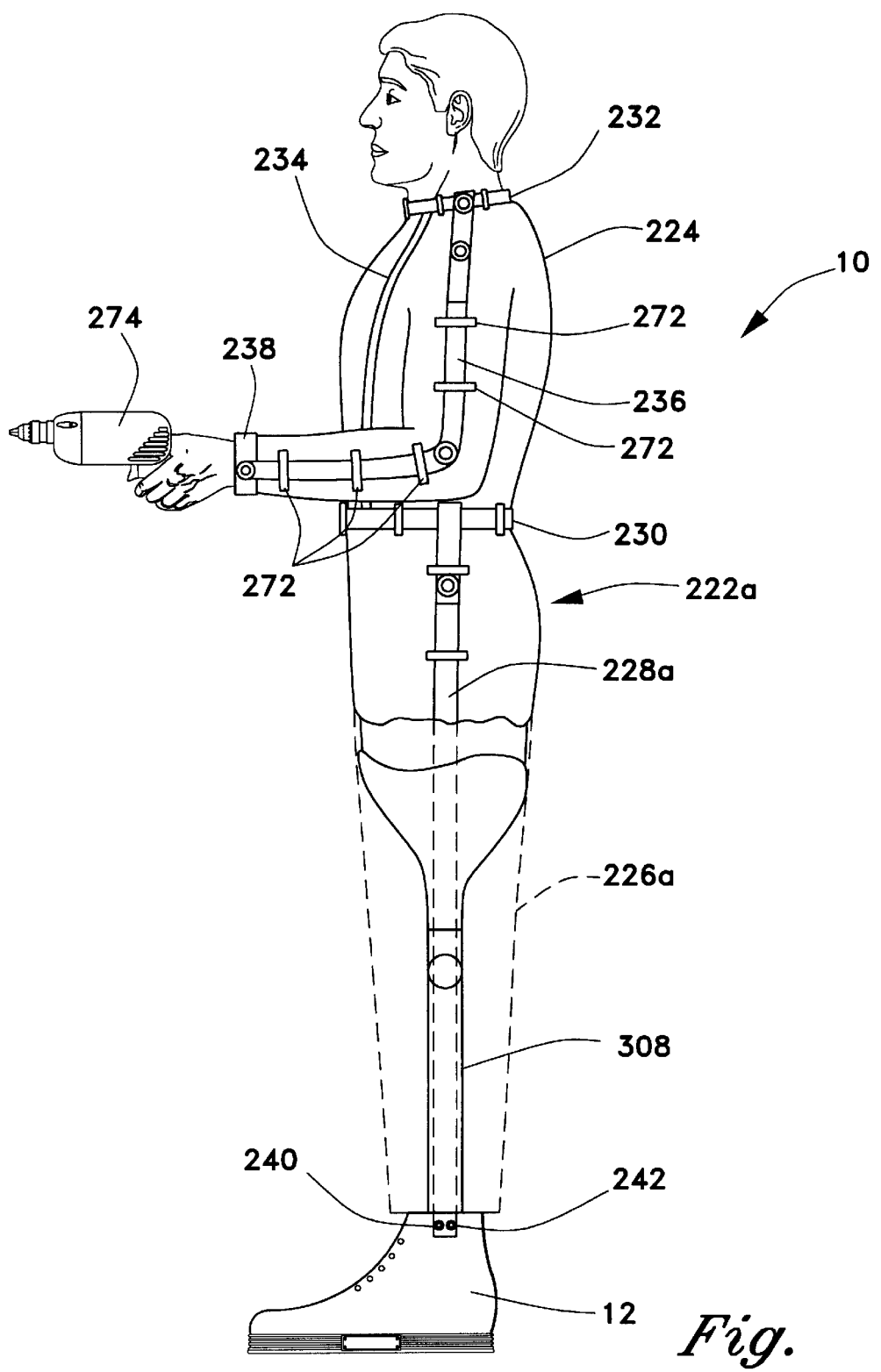
FIG. 14 is an environmental view of a prosthetic leg and an electric drill powered by the human powered electrical energy generation system according to the present invention.

Referring to FIG. 14, a power drill 274 is shown as an example of an appliance that can be powered by the power generation system of the present invention. The power cord of the drill would have to be connected to a selected pair of connectors (not shown) so that the drill can draw power from the human powered electrical generation system of the present invention. Once connected to the selected pair of connectors 264 and 266, the drill 274 can be used in the usual manner.

Figure 15:
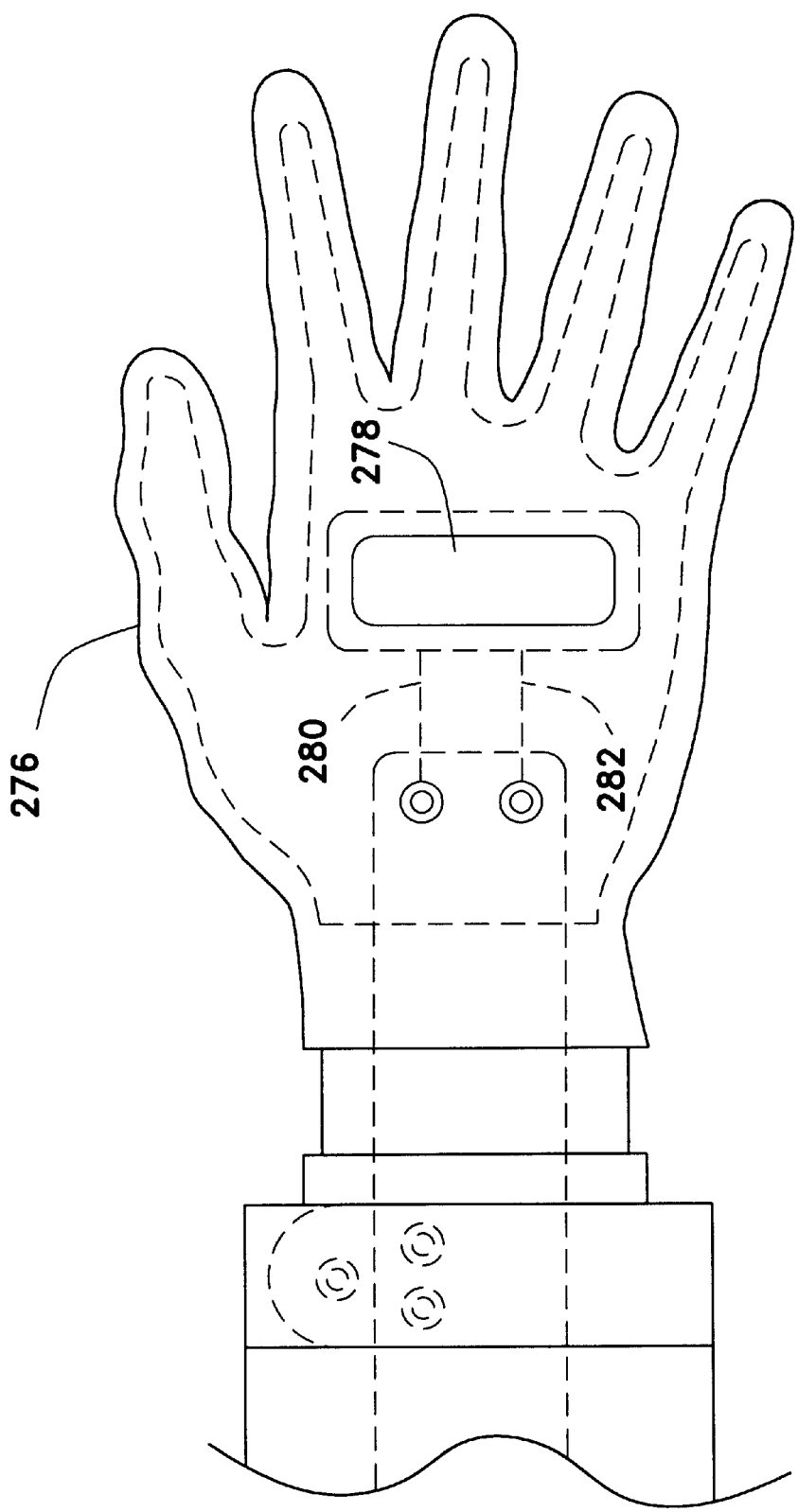
FIG. 15 is an environmental view of a heated glove having a pressure switch which automatically controls the supply of electrical energy to an appliance powered by the human powered electrical energy generation system according to the present invention and grasped by a user.

Referring to FIG. 15, a glove 276 for use with the specialized garment of the present invention can be seen. The glove 276 has a pressure switch 278 that automatically allows power to be supplied from a selected pair of connectors 264 and 266 or 268 and 270 (see circuit diagram shown in FIG. 22) to an appliance such as the power drill, when the appliance is grasped by a person wearing the glove 276. The pressure switch 278 is well known and is of a type biased toward the open position. When pressure is applied to the switch 278, the contacts of the switch are closed allowing the flow of electrical current. One lead 280 of the pressure switch 278 is connected to a connector 266 or 270 depending upon which hand the glove 276 is on. The other lead 282 of the pressure switch 278 ultimately terminates in a connector (not shown) resembling the connector 266 or 270 and located near a respective connector 264 or 268. The power cord from the appliance is then connected to the connector in communication with the lead 282 and to the respective connector 264 or 268. The pressure switch 278 is now in position in the circuit supplying power to the appliance such that the pressure switch 278 can control the supply of electrical power to the appliance.

Figure 18:
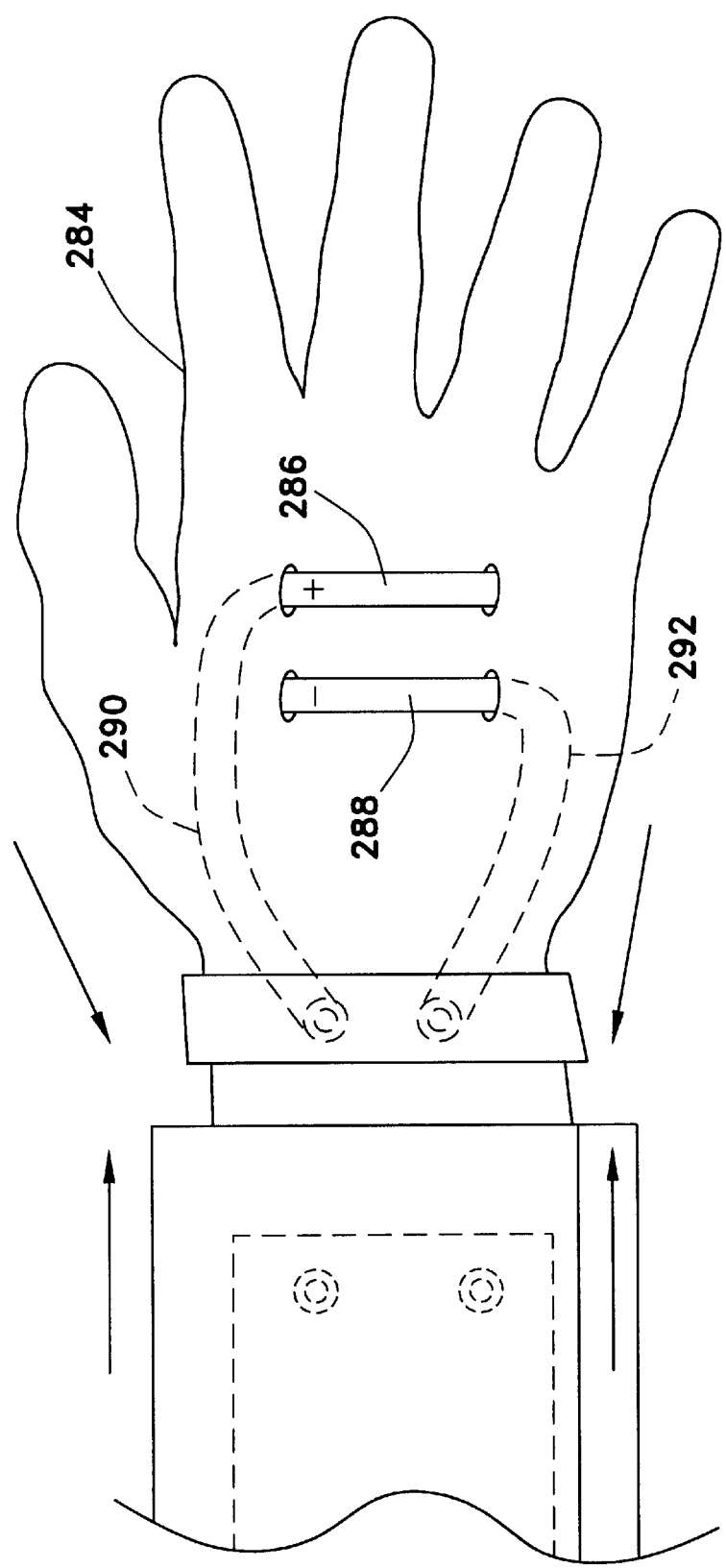
FIG. 18 is an environmental view of a glove having electrical contacts which automatically supply electrical energy from the human powered electrical energy generation system according to the present invention to an appliance grasped by a user.

Referring to FIG. 18, another glove 284 for use with the specialized garment of the present invention can be seen. The glove 284 has a pair of exposed contacts 286 and 288 on the palm of the hand which automatically engage and supply power to conductive pads on an appliance, for example the recharging contact pads on a cordless telephone, when the appliance is grasped by a person wearing the glove 284. Using the glove 284 the appliance's own storage battery will not run down as much as would be the case otherwise. Power is supplied to the contacts 286 and 288 from a selected pair of connectors 264 and 266 or 268 and 270. The lead 290 from the contact pad 286 is connected to a connector 266 or 270 (see circuit diagram shown in FIG. 22) depending upon which hand the glove 284 is on. The lead 292 of the contact 288 is connected to a respective connector 264 or 268.

Figure 16:
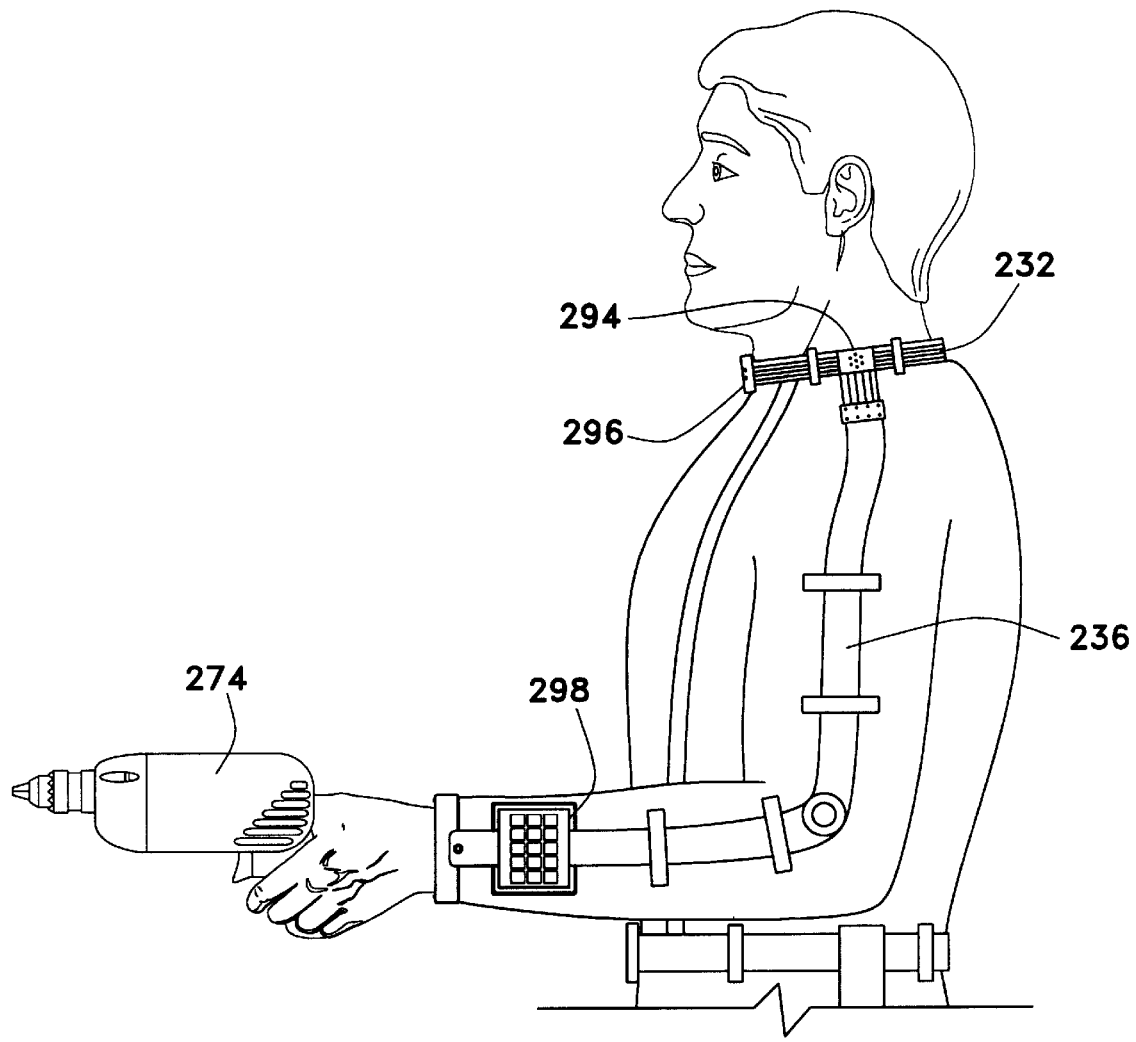
FIG. 16 is an environmental view of the garment having electrically conductive pathways and also showing a hands-free cellular telephone according to the present invention.
Figure 19:
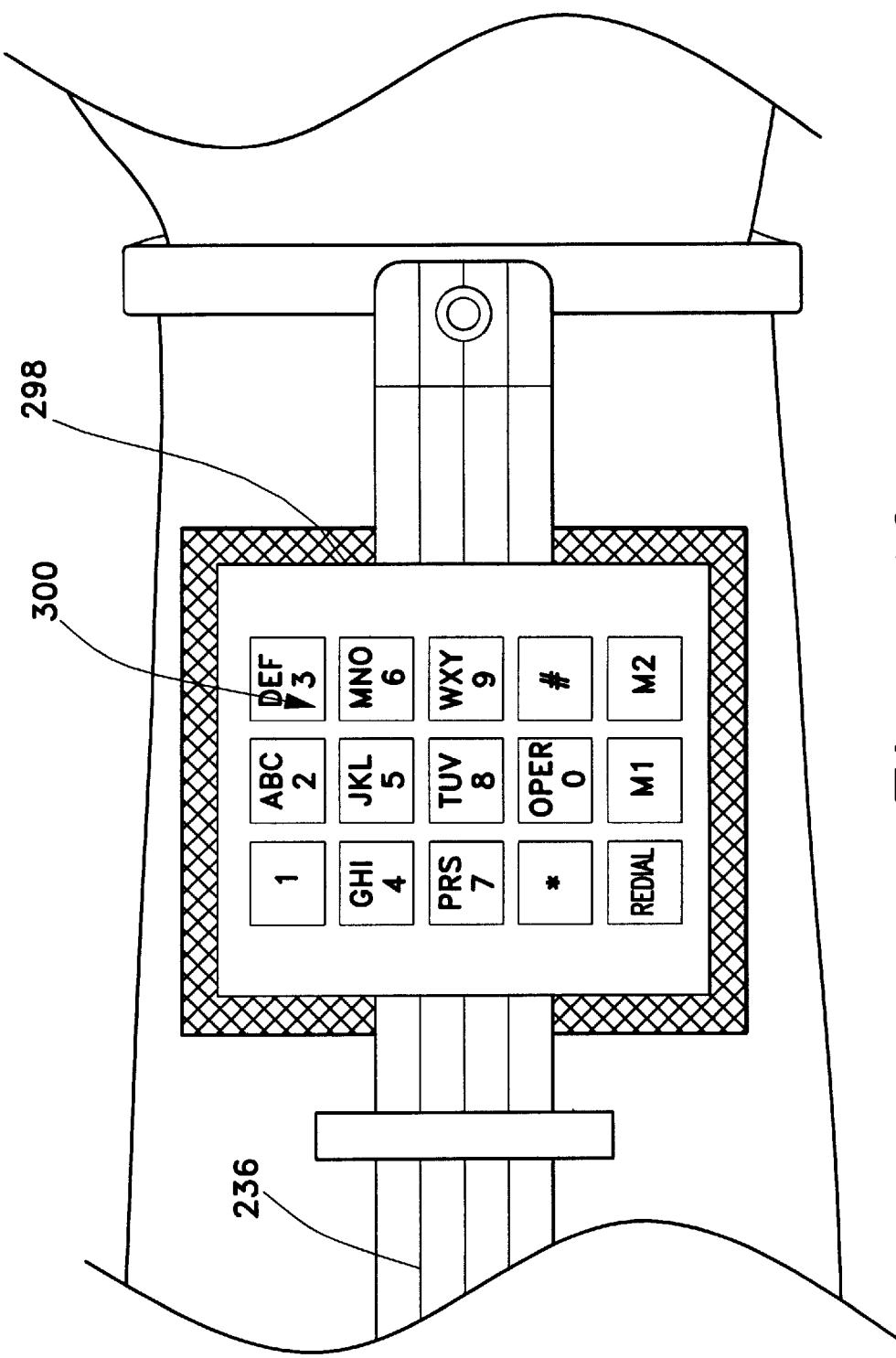
FIG. 19 is an environmental view showing the key pad of the hands-free cellular telephone according to the present invention.

Referring to FIGS. 16 and 19, a cellular telephone adapted for use with the present invention can be seen. The cellular telephone includes a speaker 294 and a microphone 296 which are attached to the neck bus 232. The speaker and microphones are connected to the main housing of the telephone 298, which is carried on the wrist, by dedicated wires in the arm bus 236. The housing 298 contains the main circuitry of the cellular telephone as well as the key pad 300 which is used for dialing telephone numbers. The cellular telephone derives its power through the arm bus 236. The cellular telephone of the present invention allows hands-free use of a cellular telephone.

Figure 12:
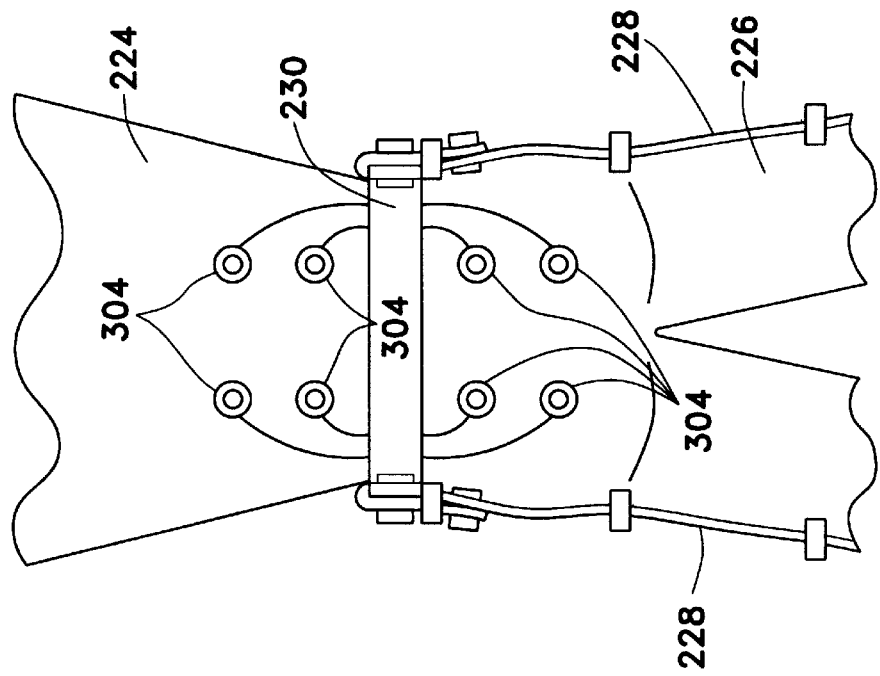
FIG. 12 is an environmental view showing the placement of the electrodes of a transcutaneous electrical nerve stimulation unit powered by the human powered electrical energy generation system according to the present invention.
Figure 11:
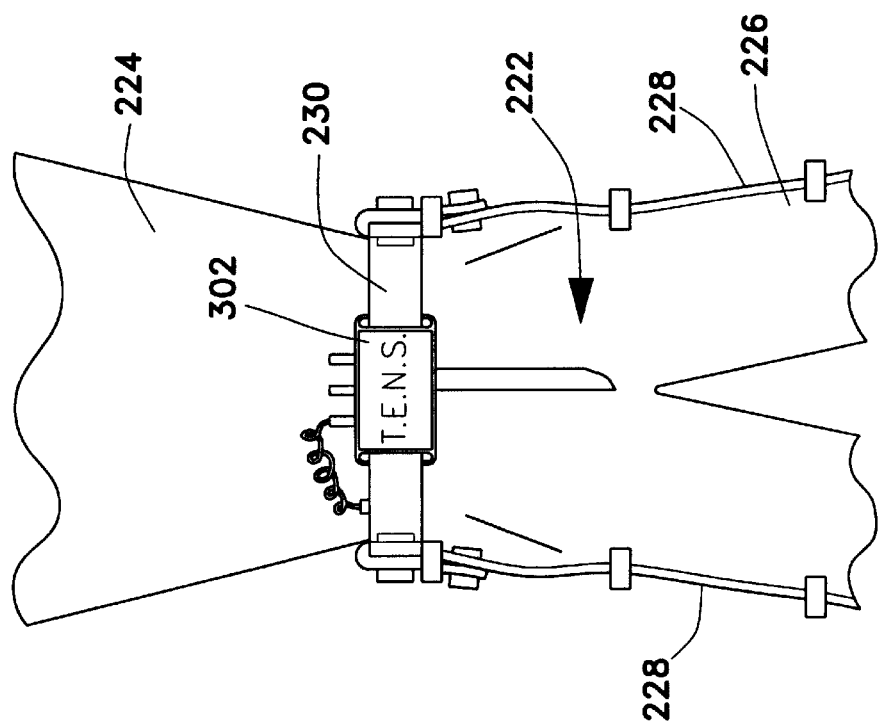
FIG. 11 is an environmental view of a transcutaneous electrical nerve stimulation unit powered by the human powered electrical energy generation system according to the present invention.

Referring to FIGS. 11 and 12, a transcutaneous electrical nerve stimulation (or TENS) unit 302, which is powered by the human powered electrical generation system of the present invention, can be seen. Many people suffer from debilitating lower back pain which severely restricts their activities. Such people often find relief from the use of TENS units. A portable TENS unit which can be used to provide therapeutic neural stimulation to such people while they engage in normal daily activities, can be of great benefit to people suffering from chronic pain because such a device can provide relief while the person is engaged in the normal activities that would otherwise be too painful for the person to perform. Thus, the TENS unit 302 increases the range of activities that a person suffering from chronic pain can engage in. The TENS unit 302 is powered through the waist bus 230. The TENS unit 302 can be separate from the control panel housing 246 shown in FIG. 20, or the TENS unit 302 can integrate the functions of the control panel housing 246 and a TENS unit into a single unit. The electrodes 304, used for the actual neural stimulation, can be connected via their own dedicated wires in the waist bus 230 to the TENS unit 302.

Figure 13:
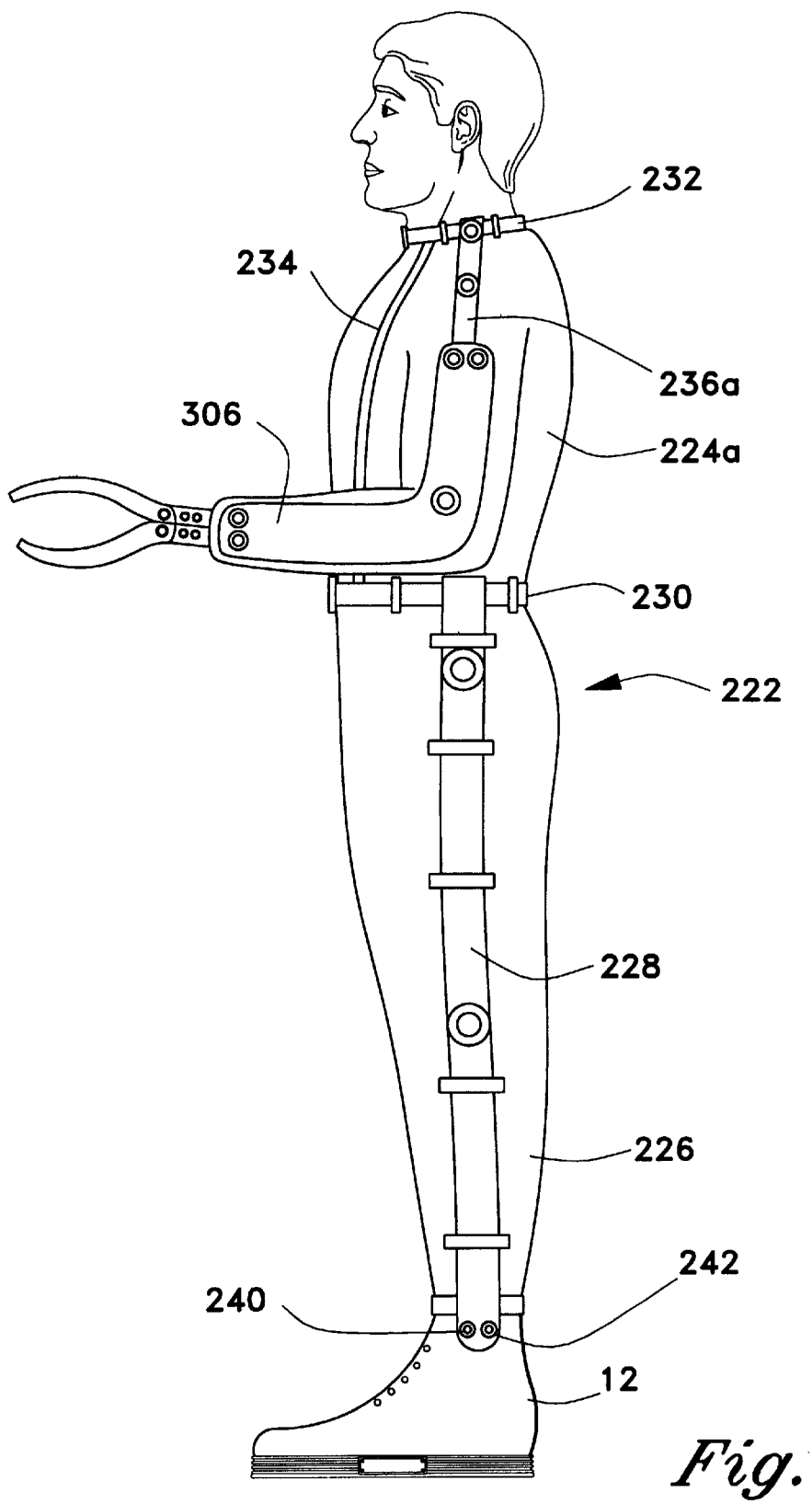
FIG. 13 is an environmental view of a prosthetic arm powered by the human powered electrical energy generation system according to the present invention.

Referring to FIGS. 13 and 14, the human powered electrical generation system of the present invention can be used to power artificial or prosthetic limbs of the myoelectric type. FIG. 13 shows a modified upper body garment portion 224a which is adapted for use with an artificial arm 306. The modified upper body garment portion 224a has a shortened arm bus 236a. The power connections for the prosthetic arm 306 are connected to a selected pair of connectors (not shown) which are provided on the arm bus 236a. Thus the artificial arm 306 can derive power for its normal functions from the human powered electrical generation system of the present invention.

FIG. 14 shows a fragmentary view of the pants portion 222a which exposes an artificial leg 308 being used with the power generating footwear 12 and the specialized garment having conductive pathways, of which the pants portion 222a is a part. The modified pants portion 222a has a leg bus 228a and a pant leg 226a. A power generating footwear item 12 is worn on the foot of the artificial leg 308. Thus the artificial leg itself can generate at least part of the power necessary for its operation. The connectors 240 and 242 of the footwear item 12 allow the energy produced by the footwear item 12 to be supplied to the leg bus 228a. The power connections for the prosthetic leg 308 can then be connected to a selected pair of connectors (not shown) provided on the leg bus 228a. Thus the artificial leg 308 can derive power for its normal functions from the human powered electrical generation system of the present invention.

Furthermore, the artificial leg 308 may be powered by the footwear 12 worn on a healthy natural leg (not shown) as well as the footwear 12 worn on the artificial leg (shown). The mechanism illustrated in FIGS. 1, 2A, and 2B may be used to simulate the motion of a natural and healthy foot in the artificial foot by driving the mechanism in the footwear 12 using an external source of energy, such as power generated by the footwear 12 worn on the natural healthy foot, instead of using the mechanism in the footwear 12 worn on the artificial leg to generate electrical energy. The movements of the mechanism in the footwear 12 worn on the artificial leg would be precisely controlled using tachometers and encoders to simulate the motions of a natural foot in the artificial foot. In this instance the electrical signal is applied to the artificial leg to produce extraordinarily precise mechanical motion. Other examples of appliances that can be powered by the human powered electrical generation system of the present invention includes lap-top, notebook, and palm-top computers and personal digital assistants.

Figure 17:
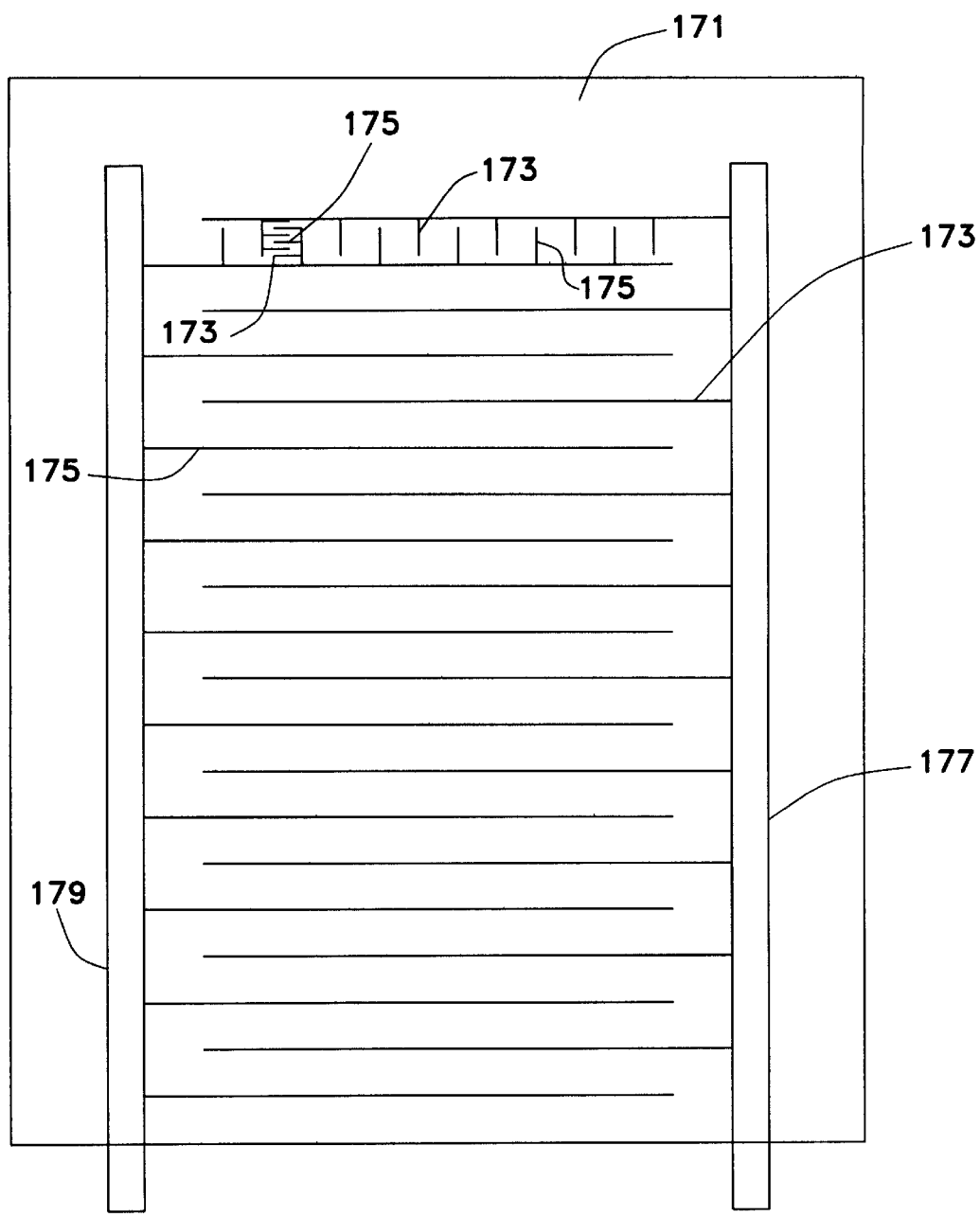
FIG. 17 is a fragmentary view of a fabric with integrated conductors thereon for use with an alternative embodiment of the garment having electrically conductive pathways according to the present invention.

Referring to FIG. 17, a portion of a sheet material 171 having a pattern of integrated conductors can be seen. The sheet material 171 can be a woven fabric or a continuous sheet. If the material 171 is a woven fabric, then the material 171 can be formed by weaving conductive and non-conductive fibers together to form a pattern of conductors separated by strands of insulating material. With continuous sheet material, the conductors are adhered to the sheet or otherwise deposited in a pattern such as that shown in FIG. 17. The continuous sheet material should be an insulator and provides a substrate and a supporting structure for the conductors 173 and 175. Regardless of the type of material, the conductors are formed into a pattern of interdigitated positive and negative conductors, 173 and 175 respectively, thus forming the integrated circuit cloth 171. The conductors 173 and 175 are in electrical communication with the power supply conductors 177 and 179, respectively. When the cloth 171 is incorporated into the garment of the present invention, the power supply conductors 177 and 179 can be energized by the human powered electrical generation system of the present invention. The integrated circuit cloth 171, when incorporated into a garment, can serve in a variety of applications including medical applications requiring electrical stimulation and deterring insect, dog, or wild animal bites. Additional resistive or thermoelectric fibers can be connected between the conductors 173 and 175 for use in microenvironmental heating or cooling applications. Other applications of this type of integrated circuit cloth may include the use of the integrated circuit cloth in pillows and bedding for health related applications, the use of the integrated circuit cloth in carpets for environmental applications such as electrostatic dust collection and removal, as well as the use of the integrated circuit cloth in window screens for security purposes.

Figure 21A:
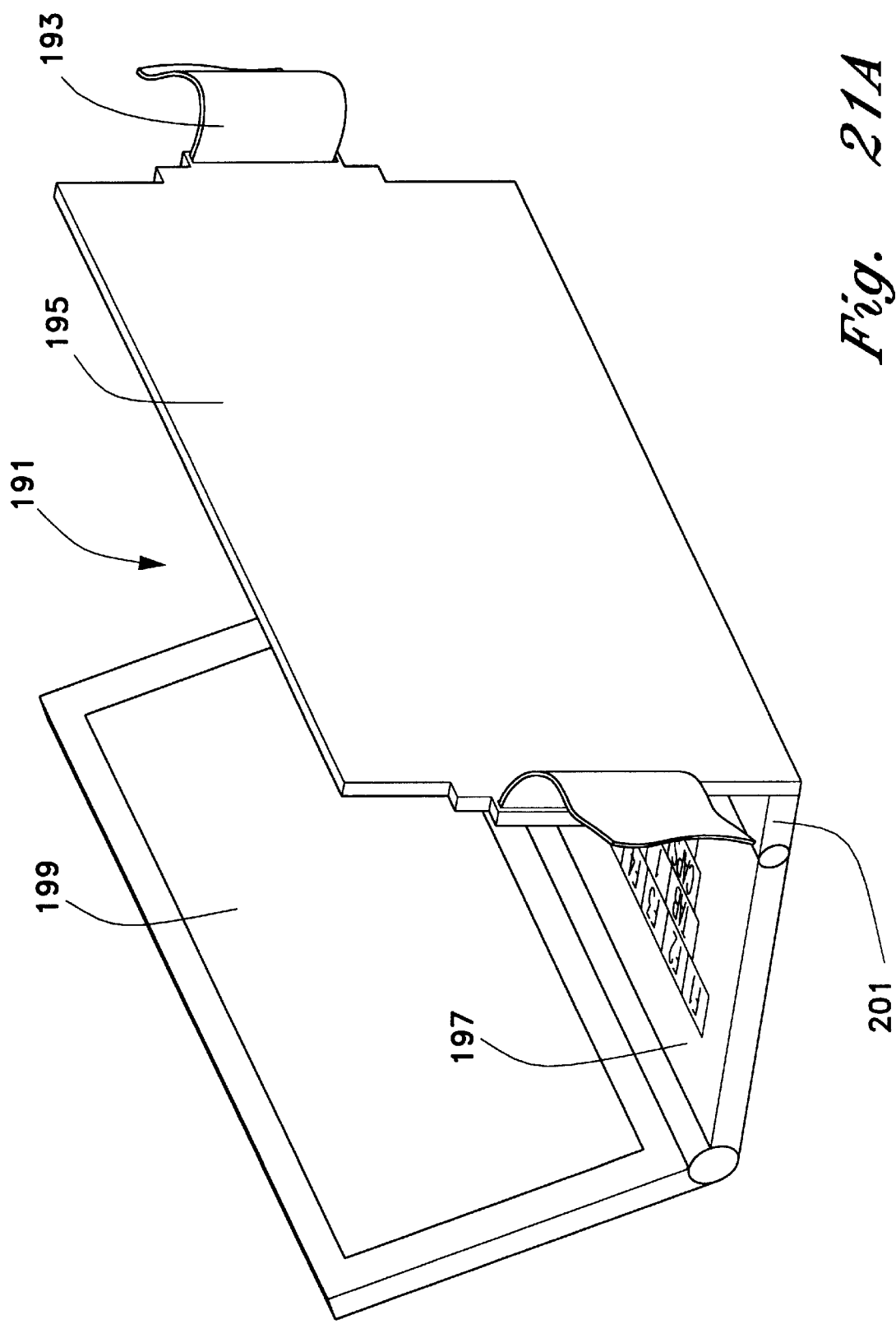
FIG. 21A is a perspective view of a microcomputer that attaches to the belt of the garment having conductive pathways and draws its power from the human powered electrical energy generation system of the present invention.
Figure 21B:
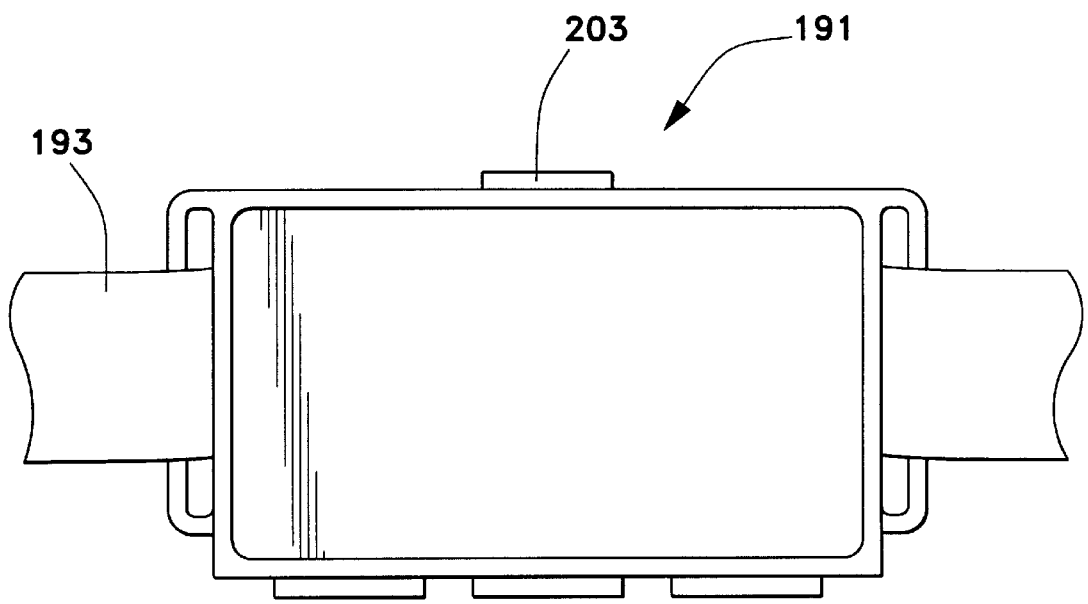
FIG. 21B is an environmental view of the microcomputer that attaches to the belt of the garment having conductive pathways, showing the microcomputer in the folded or closed configuration.
Figure 22:
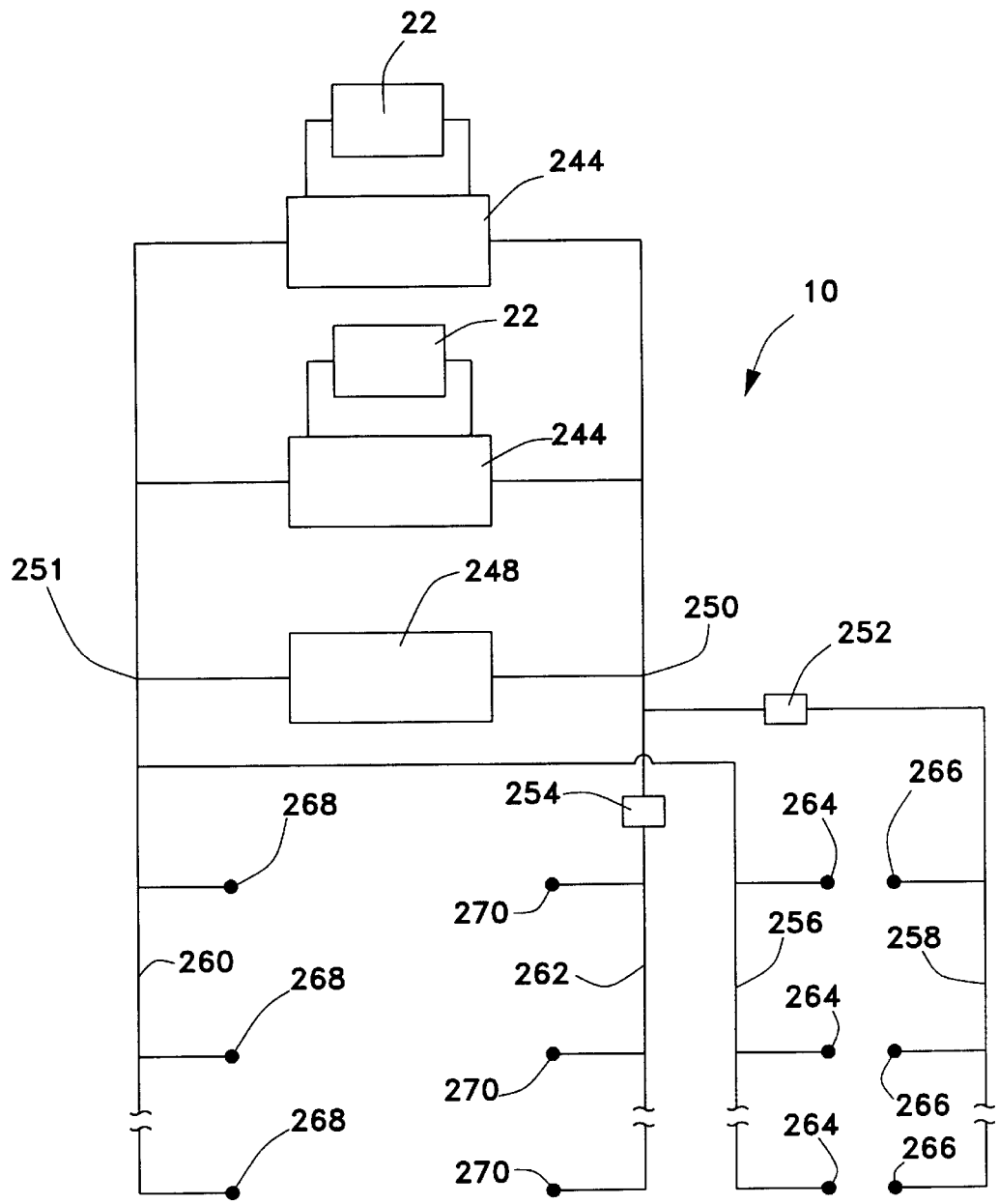
FIG. 22 is a schematic diagram showing the components of the circuit used to supply electrical energy from the human powered electrical energy generation system to various locations on the garment having a conductive network according to the present invention.

FIGS. 21A and 21B show a belt attachable notebook computer 191 which is powered by the human powered electrical energy generating system of the present invention. The computer 191 is attached to a belt 193 worn around the user's waist. Alternatively, the computer 191 can be worn on the waist bus 230 as shown in FIG. 14. The computer 191 can draw its power from any convenient location on any of the buses 230, 234, or 228a shown in FIG. 14. The computer 191 has a base 195 which attaches to the belt 193. The keyboard unit 197 is hingedly attached to the base unit 195. A display unit 199 is hingedly attached to the keyboard unit 197. The hinge between the keyboard unit 197 and the display unit 199 allows the display unit to fold flat against the keyboard unit. The hinge between the base unit 195 and the keyboard unit 197 is spaced apart from the face of the base unit 195 by an extension plate 201. The hinge between the base unit 195 and the keyboard unit 197 is spaced apart from the face of the base unit 195 in order to accommodate the combined thickness of the display unit 199 and the keyboard unit 197. With the display unit 199 folded against the keyboard unit 197, both the keyboard unit 197 and the display unit 199 are folded against the base unit 195 to form a secure, protected package when the computer 191 is not in use. In this closed configuration of the computer 191, the display unit 199 is sandwiched between the base unit 195 and the keyboard unit 197. A releasable catch 203 can be used to selectively retain the computer 191 in the closed configuration.

The folding steps above are reversed to transform the computer 191 to the open configuration illustrated in FIG. 21A. In the open configuration the computer's keyboard unit 197 and the computer's display unit 199 are exposed and can be accessed for use. The computer 191 is a general purpose computer and can be used for any applications that notebook computers are normally used for, such as database management, accounting, communications, and word processing. In addition to the ordinary uses to which notebook computers are put, the computer 191 may be used by police for instant access to criminal and/or vehicle databases, by the military for instant access to battlefield information, and by industry for immediate engineering calculations or for industrial control applications.

The computer 191 can be used in conjunction with the cuff 155 to monitor blood pressure and other vital signs. The one-way valve 159 can be replaced by an electrically actuated valve controlled by the computer 191. When a user wishes to monitor his or her blood pressure, he or she can enter a command into the computer 191 which causes the electrically actuated valve to close until the cuff 155 is fully inflated. The computer 191 is programmed to then control the electrically actuated valve to gradually reduce the pressure in the cuff 155. A sensor can be used to pick up the pulses generated by the pulsatile flow of blood through the arteries as the pressure in the cuff 155 falls. The same or a different sensor can also sense the pneumatic pressure in the cuff 155. The computer 191 can then process the output signals from these sensors to calculate and display systolic pressure, diastolic pressure, and heart rate. The computer 191 can also be used to generate an alarm and/or alert emergency personnel in a event of a medical emergency such as stroke, heart attack, or a woman going into labor, as indicated by the vital signs being monitored. Sensors suitable for such medical monitoring purposes are well known.

It is to be understood that the present invention is not limited to the embodiments described above, but encompasses any and all embodiments within the scope of the following claims.

I claim:

1. A human powered electrical generation system comprising:

a footwear item having a sole, said sole having a heel portion and a toe portion;

an electrical energy generator incorporated into said sole;

a first pair of conductive couplers provided on said footwear item, said pair of conductive couplers being in electrical communication with said electrical energy generator;

powering means for converting compression of at least one of said heel portion and said toe portion of said sole into mechanical energy and powering said electrical energy generator using the mechanical energy;

a garment dimensioned and configured to be worn by a wearer, said garment having a conductive bus in communication with said pair of conductive couplers, said conductive bus providing conductive pathways distributing electrical energy provided by said electrical energy generator to at least selected locations on said garment;

at least a second pair of conductive couplers supported by said garment, said second pair of conductive couplers being in electrical communication with said conductive bus; and an appliance electrically communicating with said second pair of conductive couplers to thereby receive electrical energy from said conductive bus, said appliance being carried about the wearer's body.

2. The human powered electrical generation system according to claim 1, wherein said appliance is a cellular telephone.

3. The human powered electrical generation system according to claim 1, wherein said appliance is a power tool.

4. The human powered electrical generation system according to claim 1, wherein said appliance is a transcutaneous electrical nerve stimulator unit.

5. The human powered electrical generation system according to claim 1, wherein said appliance is an artificial limb.

6. The human powered electrical generation system according to claim 1, wherein said heel portion of said sole has a top wall and a bottom wall, said bottom wall being moved closer to said top wall when said heel portion of said sole is subjected to compressive forces, said electrical energy generator has a generator shaft, rotation of said generator shaft causing said electrical energy generator to produce electrical energy, and wherein said powering means comprises:

a plate projecting from said top wall, said plate having a slot which extends parallel to said top wall;

a pivot pin slidably supported by said slot;

a crank wheel rotatably supported near said electrical energy generator, said crank wheel being coupled to said generator shaft such that rotation of said crank wheel causes rotation of said generator shaft;

a crank throw eccentrically fixed to said crank wheel;

a first linkage bar having a first end and a second end, said first end of said first linkage bar being pivotally attached to said bottom plate; and a second linkage bar having a first end and a second end, said first end of said second linkage bar being pivotally attached to said second end of said first linkage bar by said pivot pin to form a pivotal attachment between said first end of said second linkage bar and said second end of said first linkage bar, such that said pivotal attachment between said first end of said second linkage bar and said second end of said first linkage bar is capable of moving slidably along said slot, said second end of said second linkage bar being pivotally supported by said crank throw, whereby movement of said bottom plate of said heel portion and said top plate of said heel portion toward one another due to application of compressive forces to said heel portion causes linear movement of said first end of said second linkage bar along said slot which in turn causes rotational motion of said crank wheel and consequently production of electrical energy by said electrical energy generator.

7. The human powered electrical generation system according to claim 6, wherein said toe portion of said sole has a top wall and a bottom wall, said bottom wall of said toe portion being capable of movement relative to said top wall of said toe portion, and wherein said powering means further comprises:

a second plate projecting from said bottom wall of said toe portion, said second plate having a second slot which extends parallel to said bottom wall of said toe portion;

a second pivot pin slidably supported by said second slot;

a third linkage bar having a first end and a second end, said first end of said third linkage bar being pivotally attached to said top wall of said toe portion; and a fourth linkage bar having a first end and a second end, said first end of said fourth linkage bar being pivotally attached to said second end of said third linkage bar by said second pivot pin to form a pivotal attachment between said first end of said fourth linkage bar and said second end of said third linkage bar, such that said pivotal attachment between said first end of said fourth linkage bar and said second end of said third linkage bar is capable of moving slidably along said second slot, said second end of said fourth linkage bar being pivotally supported by said crank throw, whereby movement of said bottom plate of said toe portion relative to said top plate of said toe portion causes linear movement of said first end of said fourth linkage bar along said second slot which in turn causes rotational motion of said crank wheel and consequently production of electrical energy by said electrical energy generator.

8. The human powered electrical generation system according to claim 6, further comprising:

a pair of conductive couplers provided on said footwear item, said pair of conductive couplers being in electrical communication with said electrical energy generator; and a garment having a conductive bus in communication with said pair of conductive couplers, said conductive bus providing conductive pathways distributing electrical energy provided by said electrical energy generator to at least selected locations on said garment.

9. The human powered electrical generation system according to claim 8, wherein said pair of conductive couplers is a first pair of conductive couplers and said garment is dimensioned and configured to be worn by a wearer, the human powered electrical generation system further comprising:

at least a second pair of conductive couplers supported by said garment, said second pair of conductive couplers being in electrical communication with said conductive bus; and an appliance electrically communicating with said second pair of conductive couplers to thereby receive electrical energy from said conductive bus, said appliance being carried about the wearer's body.

10. The human powered electrical generation system according to claim 9, wherein said appliance is selected from the group consisting of a cellular telephone, a power tool, and a belt-attachable notebook computer.

11. The human powered electrical generation system according to claim 1, wherein said heel portion of said sole has a top wall and a bottom wall, said bottom wall being moved closer to said top wall when said heel portion of said sole is subjected to compressive forces, said electrical energy generator has a generator shaft, rotation of said generator shaft causing said electrical energy generator to produce electrical energy, and wherein said powering means comprises:

a crank wheel rotatably supported near said electrical energy generator, said crank wheel being coupled to said generator shaft such that rotation of said crank wheel causes rotation of said generator shaft;

a crank throw eccentrically fixed to said crank wheel;

a plurality of linkage bars pivotally connected in succession, said plurality linkage bars extending from a first pivotal attachment to said bottom plate to a second pivotal attachment to said crank throw, whereby movement of said bottom plate of said heel portion and said top plate of said heel portion toward one another due to application of compressive forces to said heel portion causes displacement of said second pivotal attachment relative to said first pivotal attachment, thereby causing rotational motion of said crank wheel and consequently production of electrical energy by said electrical energy generator.

12. The human powered electrical generation system according to claim 1, wherein said heel portion of said sole has a top wall and a bottom wall, said bottom wall being moved closer to said top wall when said heel portion of said sole is subjected to compressive forces, said electrical energy generator has a generator shaft, rotation of said generator shaft causing said electrical energy generator to produce electrical energy, and wherein said powering means comprises:

a corrugated spring having a plurality of corrugations, a fixed end and a free end, said corrugated spring being disposed intermediate said top wall and said bottom wall such that when said bottom wall of said heel portion and said top wall of said heel portion move toward one another due to application of compressive forces to said heel portion, said plurality of corrugations are relatively flattened and said free end of said corrugated spring is caused to move closer to said electrical energy generator;

a crank wheel rotatably supported near said electrical energy generator, said crank wheel being coupled to said generator shaft such that rotation of said crank wheel causes rotation of said generator shaft;

a crank throw eccentrically fixed to said crank wheel; and a linkage bar having a first end and a second end, said first end of said linkage bar being pivotally attached to said free end of said corrugated spring, said second end of said linkage bar being pivotally supported by said crank throw, whereby movement of said bottom wall of said heel portion and said top wall of said heel portion toward one another due to application of compressive forces to said heel portion causes movement of said free end of said corrugated spring which in turn causes rotational motion of said crank wheel and consequently production of electrical energy by said electrical energy generator.

13. The human powered electrical generation system according to claim 12, wherein said toe portion of said sole has a top wall and a bottom wall, said bottom wall of said toe portion being capable of movement relative to said top wall of said toe portion, said footwear item has a length directed substantially from said heel portion toward said toe portion, and wherein said powering means further comprises:

a second corrugated spring having a second plurality of corrugations, a fixed end and a free end, said second corrugated spring being disposed intermediate said top wall of said toe portion and said bottom wall of said toe portion such that when said bottom wall of said toe portion and said top wall of said toe portion move relative to one another, each of said second plurality of corrugations is caused to change its dimension in a direction defined substantially by said length of said footwear item and said free end of said second corrugated spring is caused to change position along said length of said footwear item;

a second linkage bar having a first end and a second end, said first end of said second linkage bar being pivotally attached to said free end of said second corrugated spring, said second end of said second linkage bar being pivotally supported by said crank throw, whereby movement of said bottom wall of said toe portion relative to said top wall of said toe portion causes movement of said free end of said second corrugated spring which in turn causes rotational motion of said crank wheel and consequently production of electrical energy by said electrical energy generator.

14. The human powered electrical generation system according to claim 1, wherein said heel portion of said sole has a flexible air chamber having a first air inlet and a first air outlet, said flexible air chamber being squeezed when said heel portion of said sole is subjected to compressive forces, said electrical energy generator has a generator shaft, rotation of said generator shaft causing said electrical energy generator to produce electrical energy, and wherein said powering means comprises:

a first conduit communicating with said first air inlet and with atmospheric air surrounding said footwear item;

a first one-way valve provided in said first conduit, said first one-way valve acting to allow air movement into said flexible air chamber only and only when there is lower air pressure within said flexible air chamber as compared to atmospheric pressure of air surrounding said footwear item;

a second one-way valve provided at said first air outlet, said second one-way valve acting to allow air movement out of said flexible air chamber only and only when there is higher air pressure within said flexible air chamber as compared to atmospheric pressure of air surrounding said footwear item; and a pneumatic turbine rotatably supported near said electrical energy generator, said pneumatic turbine being coupled to said generator shaft such that rotation of said pneumatic turbine causes rotation of said generator shaft, said pneumatic turbine communicating with said first air outlet such that air issuing from said first air outlet impinges upon said pneumatic turbine and causes said pneumatic turbine to rotate, whereby compression of said flexible air chamber due to application of compressive forces to said heel portion causes air to be issued from said first air outlet which causes rotational motion of said pneumatic turbine and consequently production of electrical energy by said electrical energy generator.

15. The human powered electrical generation system according to claim 14, wherein said toe portion of said sole has a second flexible air chamber having a second air inlet and a second air outlet, said second flexible air chamber being squeezed when said toe portion of said sole is subjected to compressive forces, and wherein said powering means further comprises:

a second conduit communicating with said second air inlet and with atmospheric air surrounding said footwear item;

a third one-way valve provided in said second conduit, said third one-way valve acting to allow air movement into said second flexible air chamber only and only when there is lower air pressure within said second flexible air chamber as compared to atmospheric pressure of air surrounding said footwear item; and a fourth one-way valve provided at said second air outlet, said fourth one-way valve acting to allow air movement out of said second flexible air chamber only and only when there is higher air pressure within said second flexible air chamber as compared to atmospheric pressure of air surrounding said footwear item, said pneumatic turbine communicating with said second air outlet such that air issuing from said second air outlet impinges upon said pneumatic turbine and causes said pneumatic turbine to rotate, whereby compression of said second flexible air chamber due to application of compressive forces to said toe portion causes air to be issued from said second air outlet which causes rotational motion of said pneumatic turbine and consequently production of electrical energy by said electrical energy generator.

16. The human powered electrical generation system according to claim 1, wherein said heel portion of said sole has a flexible air chamber having a first air inlet and a first air outlet, said flexible air chamber being squeezed when said heel portion of said sole is subjected to compressive forces, wherein said toe portion of said sole has a second flexible air chamber having a second air inlet and a second air outlet, said second flexible air chamber being squeezed when said toe portion of said sole is subjected to compressive forces, said electrical energy generator has a generator shaft, rotation of said generator shaft causing said electrical energy generator to produce electrical energy, and wherein said powering means comprises:

a first conduit communicating with said first air inlet and with said second air inlet;

a second conduit communicating with said first conduit intermediate said first air inlet and said second air inlet, and with atmospheric air surrounding said footwear item;

a one-way valve provided in said second conduit, said one-way valve acting to allow air movement into said first and second flexible air chambers only and only when there is lower air pressure within said first and second flexible air chambers as compared to atmospheric pressure of air surrounding said footwear item; and a pneumatic turbine rotatably supported near said electrical energy generator, said pneumatic turbine being coupled to said generator shaft such that rotation of said pneumatic turbine causes rotation of said generator shaft, said pneumatic turbine communicating with said first and second air outlets such that air issuing from said first and second air outlets impinge upon said pneumatic turbine and cause said pneumatic turbine to rotate, whereby compression of either of said first and second flexible air chambers causes air to be issued from said first and second air outlets which cause rotational motion of said pneumatic turbine and consequently production of electrical energy by said electrical energy generator.

17. The human powered electrical generation system according to claim 16, further including thermoelectric diodes incorporated into said footwear item to one of heat and cool said footwear item as selected by a user to control a microenvironment surrounding a foot inserted into said footwear item.

18. A human powered electrical generation system comprising:

a footwear item having a sole, said sole having a heel portion and a toe portion, wherein said footwear item is a first footwear item worn on the natural leg of a user with one artificial leg having an artificial foot, the human powered electrical generation system further including a second footwear item worn on the artificial foot, said second footwear item being powered by said first footwear item to simulate movements of a natural human foot;

a pair of conductive couplers provided on said footwear item, said pair of conductive couplers being in electrical communication with said electrical energy generator;

powering means for converting compression of at least one of said heel portion and said toe portion of said sole into mechanical energy and powering said electrical energy generator using the mechanical energy; and a garment having a conductive bus in communication with said pair of conductive couplers, said conductive bus providing conductive pathways distributing electrical energy provided by said electrical energy generator to at least selected locations on said garment.

* * * * *